US010714791B2

(12) United States Patent
Ahn et al.

(10) Patent No.: US 10,714,791 B2
(45) Date of Patent: *Jul. 14, 2020

(54) GEL POLYMER ELECTROLYTE AND LITHIUM SECONDARY BATTERY INCLUDING THE SAME

(71) Applicant: LG Chem, Ltd., Seoul (KR)

(72) Inventors: Kyoung Ho Ahn, Daejeon (KR); Jung Hoon Lee, Daejeon (KR); Jeong Woo Oh, Daejeon (KR); Chul Haeng Lee, Daejeon (KR)

(73) Assignee: LG Chem, Ltd. (KR)

( * ) Notice: Subject to any disclaimer, the term of this patent is extended or adjusted under 35 U.S.C. 154(b) by 0 days.

This patent is subject to a terminal disclaimer.

(21) Appl. No.: 15/771,773

(22) PCT Filed: Sep. 1, 2017

(86) PCT No.: PCT/KR2017/009622
§ 371 (c)(1),
(2) Date: Apr. 27, 2018

(87) PCT Pub. No.: WO2018/044129
PCT Pub. Date: Mar. 8, 2018

(65) Prior Publication Data
US 2018/0342767 A1 Nov. 29, 2018

(30) Foreign Application Priority Data

Sep. 2, 2016 (KR) .................. 10-2016-0113355
Sep. 1, 2017 (KR) .................. 10-2017-0112055

(51) Int. Cl.
H01M 10/0565 (2010.01)
H01M 10/052 (2010.01)
C08J 5/22 (2006.01)
C08L 33/06 (2006.01)
C08L 71/02 (2006.01)
H01M 4/505 (2010.01)
H01M 4/525 (2010.01)
H01M 10/058 (2010.01)
H01M 10/0525 (2010.01)
H01M 4/02 (2006.01)

(52) U.S. Cl.
CPC ........ H01M 10/0565 (2013.01); C08J 5/22 (2013.01); C08L 33/06 (2013.01); C08L 71/02 (2013.01); H01M 4/505 (2013.01); H01M 4/525 (2013.01); H01M 10/052 (2013.01); H01M 10/058 (2013.01); H01M 10/0525 (2013.01); H01M 2004/027 (2013.01); H01M 2004/028 (2013.01)

(58) Field of Classification Search
CPC .......... H01M 10/052; H01M 10/0525; H01M 10/0565; H01M 10/058; H01M 4/505; H01M 4/525; H01M 2004/028; H01M 2004/027; C08J 5/22; C08L 33/06; C08L 71/02

See application file for complete search history.

(56) References Cited

U.S. PATENT DOCUMENTS

| 2007/0160888 | A1* | 7/2007 | Takahashi | C08F 259/08 429/483 |
| 2010/0119950 | A1* | 5/2010 | Hwang | H01M 10/0565 429/303 |
| 2012/0015255 | A1* | 1/2012 | Hwang | H01M 10/0565 429/303 |
| 2013/0136998 | A1* | 5/2013 | Hwang | H01M 10/0565 429/303 |
| 2015/0288028 | A1 | 10/2015 | DeSimone et al. | |
| 2016/0043435 | A1 | 2/2016 | DeSimone | |
| 2016/0226103 | A1* | 8/2016 | Teran | C07C 69/96 |
| 2016/0359195 | A1 | 12/2016 | Makino et al. | |
| 2017/0229735 | A1* | 8/2017 | Ahn | H01M 10/0565 |

FOREIGN PATENT DOCUMENTS

| EP | 3203564 A1 | 8/2017 |
| EP | 3203565 A1 | 8/2017 |
| JP | 2004043402 | * 12/2004 |
| JP | 2006100207 | * 4/2006 |
| JP | 2014235986 | * 12/2014 |
| JP | 2015167126 A | 9/2015 |
| KR | 20110010516 A | 2/2011 |
| KR | 20150139827 A | 12/2015 |
| KR | 20160040127 A | 4/2016 |
| KR | 20160040128 A | 4/2016 |

(Continued)

OTHER PUBLICATIONS

Wong, H., Perfluoropolyether-based Electrolytes for Lithium Battery Applications, 2015, University of North Carolina at Chapel Hill, Dissertation. (Year: 2015).*
Hu et al ,Macromolecules 2009, 42, 6999 (Year: 2009).*
Extended European Search Report including Written Opinion for EP17847054 dated Aug. 14, 2018.
Search report from International Application No. PCT/KR2017/009622, dated Dec. 19, 2017.
Wong, H. C., Thesis: "Perfluoropolyether-Based Electrolytes For Lithium Battery Applications." Department of Chemistry, University of Carolina at Chapel Hill, 2015, pp. 1-160.

Primary Examiner — Alexander Usyatinsky
(74) Attorney, Agent, or Firm — Lerner, David, Littenberg, Krumholz & Mentlik, LLP

(57) ABSTRACT

The present invention relates to a gel polymer electrolyte, which includes a matrix polymer and an electrolyte solution impregnated in the matrix polymer, wherein the matrix polymer is formed in a three-dimensional network structure by polymerizing a first oligomer which includes unit A represented by Formula 1 and unit B having a crosslinkable functional group derived from a compound including at least one copolymerizable acrylate group, and a lithium secondary battery including the same.

7 Claims, No Drawings

(56) References Cited

FOREIGN PATENT DOCUMENTS

| WO | 2014062898 A1 | 4/2014 | |
| WO | WO-2016053065 A1 * | 4/2016 | .......... H01M 10/052 |

* cited by examiner

GEL POLYMER ELECTROLYTE AND LITHIUM SECONDARY BATTERY INCLUDING THE SAME

CROSS-REFERENCE TO RELATED APPLICATIONS

The present application is a national phase entry under 35 U.S.C. § 371 of International Application No. PCT/KR2017/009622, filed Sep. 1, 2017, which claims priority from Korean Patent Application No. 10-2016-0113355, filed on Sep. 2, 2016, and Korean Patent Application No. 10-2017-0112055, filed on Sep. 1, 2017, the disclosures of which are incorporated herein by reference.

TECHNICAL FIELD

The present invention relates to a gel polymer electrolyte and a lithium secondary battery including the same.

BACKGROUND ART

Demand for secondary batteries as an energy source has been significantly increased as technology development and demand with respect to mobile devices have increased. Among these secondary batteries, lithium secondary batteries having high energy density and high voltage have been commercialized and widely used.

A current collector is coated with a positive electrode active material or negative electrode active material of appropriate thickness, or the active material itself is prepared in the form of a film of appropriate length, and the film is then wound or stacked with an insulating separator to prepare an electrode assembly. Thereafter, the electrode assembly is put in a can or a container similar thereto, and a lithium secondary battery is then prepared by a process of injecting an electrolyte.

A lithium metal oxide is used as the positive electrode active material, and lithium metal, a lithium alloy, crystalline or amorphous carbon, or a carbon composite is used as the negative electrode active material. Also, an electrolyte in a liquid state, particularly, an ion conductive organic liquid electrolyte, in which a salt is dissolved in a non-aqueous organic solvent, has been mainly used as the electrolyte.

However, as interests in energy storage technologies have been increasingly grown, three is a need to develop a secondary battery which may not only be miniaturized, lightweight, and charged and discharged to high capacity, but may also have high-temperature, high-voltage safety. Accordingly, development of a battery using a gel polymer electrolyte composed of a gel polymer, instead of using a liquid electrolyte, has recently received attention.

In general, it is known that battery safety improves in the order of a liquid electrolyte, a gel polymer electrolyte, and a solid polymer electrolyte, but battery performance decreases in the same order.

That is, the gel polymer electrolyte is disadvantageous in that lithium ion conductivity is lower than that of a liquid electrolyte composed only of an electrolyte solution. A method of decreasing the thickness of the gel polymer electrolyte has been proposed to improve the conductivity. However, in this case, there may be limitations in improving the performance and safety of the battery, for example, mechanical strength is decreased and a short circuit between the gel polymer electrolyte and both positive electrode and negative electrode occurs during the preparation of the battery.

Thus, there is a need to develop a gel polymer electrolyte which may improve both performance and safety of the battery.

PRIOR ART DOCUMENTS

Korean Patent Application Laid-Open Publication No. 10-2015-0139827

DISCLOSURE OF THE INVENTION

Technical Problem

An aspect of the present invention provides a gel polymer electrolyte which may achieve effects of increasing high-voltage stability and reducing battery resistance.

Another aspect of the present invention provides a composition for the gel polymer electrolyte.

Another aspect of the present invention provides a lithium secondary battery including the gel polymer electrolyte.

Technical Solution

According to an aspect of the present invention, there is provided a gel polymer electrolyte including:

a matrix polymer; and an electrolyte solution impregnated in the matrix polymer, wherein the matrix polymer is formed in a three-dimensional network structure by polymerizing a first oligomer which includes unit A represented by Formula 1 and unit B represented by Formula 2.

[Formula 1]

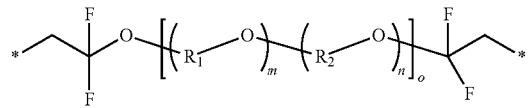

wherein, in Formula 1, $R_1$ and $R_2$ are each independently a fluorine-substituted or unsubstituted alkylene group having 1 to 4 carbon atoms, m, n, and o are the numbers of repeating units, m is an integer of 1 to 10, n is an integer of 1 to 10, and o is an integer of 1 to 500.

[Formula 2]

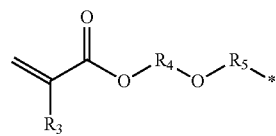

wherein, in Formula 2, $R_3$ is hydrogen, or an alkyl group having 1 to 6 carbon atoms, $R_4$ is an alkylene group having 1 to 6 carbon atoms, $-CH_2-R_6-CH_2-$, or $-CH_2-R_7-O-R_8-CH_2-$, wherein $R_6$, $R_7$, and $R_8$ are alkylene groups having 1 to 3 carbon atoms in which at least one acrylate group is substituted, $R_5$ is an alkylene group having 1 to 5 carbon atoms, or $-(CO-R_9-O-)_r-CO-NH-R_{10}-NH-CO-O-$, wherein $R_9$ is an alkylene group having 1 to 10 carbon atoms, and $R_{10}$ is an aliphatic, alicyclic, or aromatic hydrocarbon group, and r is an integer of 0 to 3.

Specifically, the aliphatic hydrocarbon group may include an alkylene group having 1 to 20 carbon atoms; an alkylene group having 1 to 20 carbon atoms which contains an isocyanate group (NCO); an alkoxylene group having 1 to 20 carbon atoms; an alkenylene group having 2 to 20 carbon atoms; or an alkynylene group having 2 to 20 carbon atoms, the alicyclic hydrocarbon group may include a substituted or unsubstituted cycloalkylene group having 4 to 20 carbon atoms; a substituted or unsubstituted cycloalkylene group having 4 to 20 carbon atoms which contains an isocyanate group (NCO); a cycloalkenylene group having 4 to 20 carbon atoms; or a heterocycloalkylene group having 2 to 20 carbon atoms, and the aromatic hydrocarbon group may include a substituted or unsubstituted arylene group having 6 to 20 carbon atoms; or a heteroarylene group having 2 to 20 carbon atoms.

The unit A represented by Formula 1 may include at least one selected from the group consisting of compounds represented by Formulae 1a to 1c.

[Formula 1a]

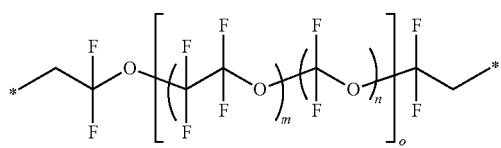

[Formula 1b]

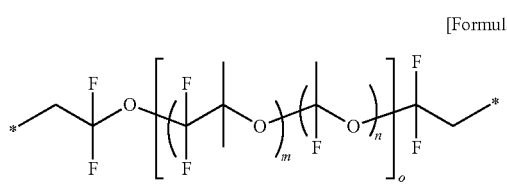

[Formula 1c]

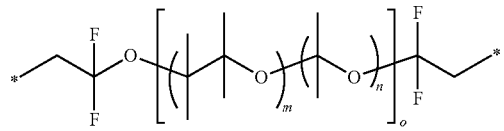

wherein, in Formulae 1a to 1c,
m, n, and o are the numbers of repeating units,
m is an integer of 1 to 10,
n is an integer of 1 to 10, and
o is an integer of 1 to 500.

The unit B represented by Formula 2 may include at least one selected from the group consisting of compounds represented by Formulae 2a to 2l.

[Formula 2a]

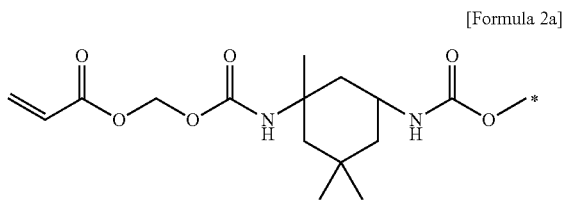

[Formula 2b]

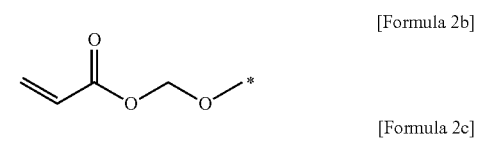

[Formula 2c]

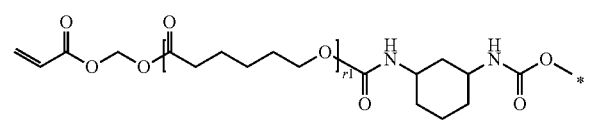

wherein, in Formula 2c,
r1 is an integer of 1 to 3.

[Formula 2d]

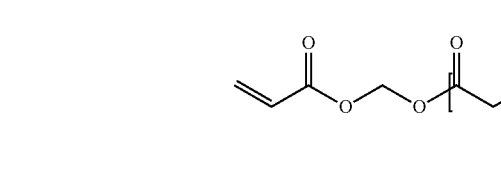

wherein, in Formula 2d,
r2 is an integer of 1 to 3.

[Formula 2e]

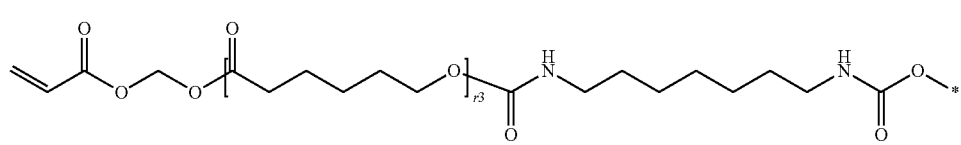

wherein, in Formula 2e,
r3 is an integer of 1 to 3.

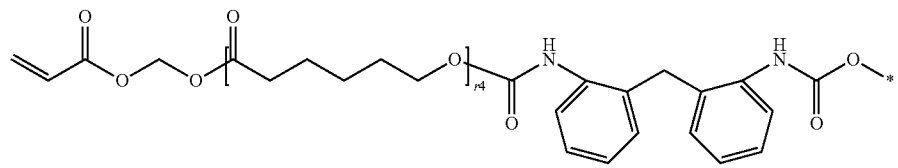
[Formula 2f]
wherein, in Formula 2f,
r4 is an integer of 1 to 3.
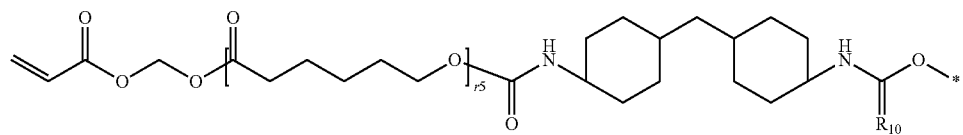
[Formula 2g]
wherein, in Formula 2g,
r5 is an integer of 1 to 3.
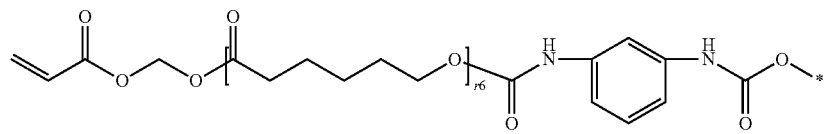
[Formula 2h]
wherein, in Formula 2h,
r6 is an integer of 1 to 3.
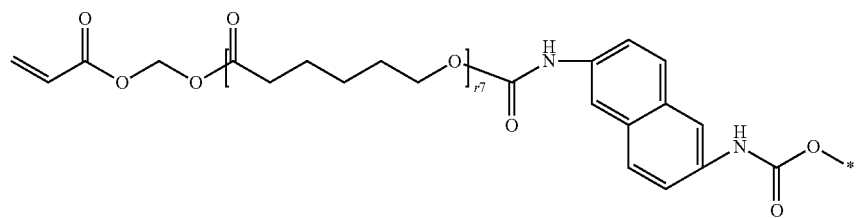
[Formula 2i]
wherein, in Formula 2i,
r7 is an integer of 1 to 3.
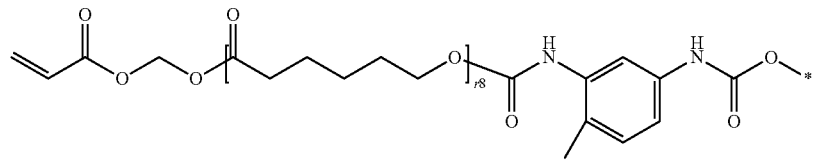
[Formula 2j]
wherein, in Formula 2j,
r8 is an integer of 1 to 3.

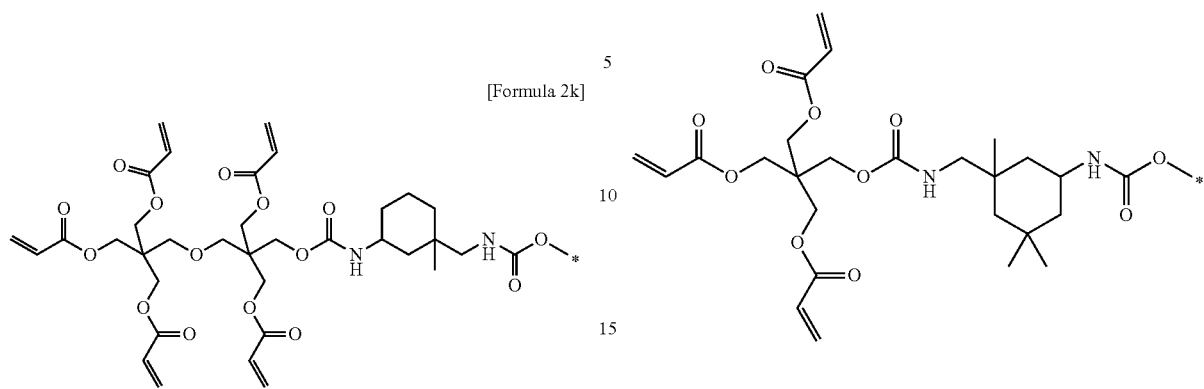

[Formula 2k]

[Formula 2l]

In the first oligomer, a molar ratio of the unit A to the unit B may be in a range of 1:90 to 90:1.

In the gel polymer electrolyte of the present invention, the first oligomer may be a compound represented by Formula 3.

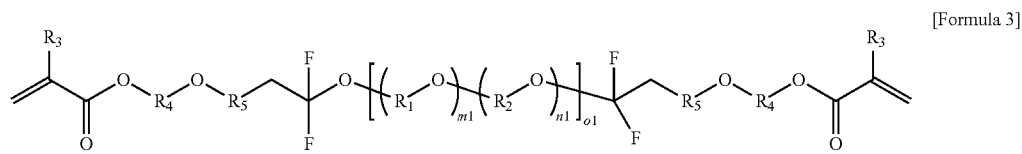

[Formula 3]

wherein, in Formula 3, $R_1$ and $R_2$ are each independently a fluorine-substituted or unsubstituted alkylene group having 1 to 4 carbon atoms, $R_3$ is hydrogen, or an alkyl group having 1 to 6 carbon atoms, $R_4$ is an alkylene group having 1 to 6 carbon atoms, —$CH_2$—$R_6$—$CH_2$—, or —$CH_2$—$R_7$—O—$R_8$—$CH_2$—, wherein $R_6$, $R_7$, and $R_8$ are alkylene groups having 1 to 3 carbon atoms in which at least one acrylate group is substituted, $R_5$ is an alkylene group having 1 to 5 carbon atoms, or —(CO—$R_9$—O—)$_r$—CO—NH—$R_{10}$—NH—CO—O—, wherein $R_9$ is an alkylene group having 1 to 10 carbon atoms, and $R_{10}$ is an aliphatic, alicyclic, or aromatic hydrocarbon group, m1, n1, and o1 are the numbers of repeating units, m1 is an integer of 1 to 10, n1 is an integer of 1 to 10, o1 is an integer of 1 to 500, and r is an integer of 0 to 3.

Specifically, the oligomer represented by Formula 3 may include at least one compound selected from the group consisting of compounds represented by Formulae 3a to 3f.

[Formula 3a]

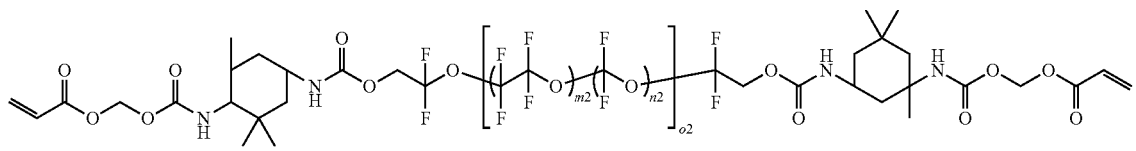

wherein, in Formula 3a,
m2, n2, and o2 are the numbers of repeating units,
m2 is an integer of 1 to 10,
n2 is an integer of 1 to 10, and
o2 is an integer of 1 to 500.

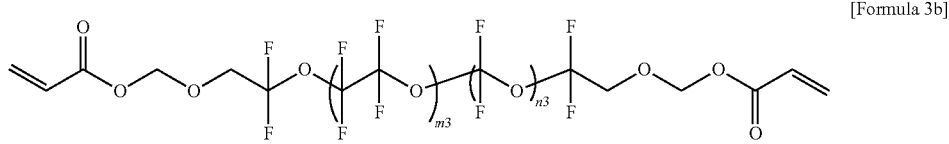

[Formula 3b]

wherein, in Formula 3b,
m3, n3, and o3 are the numbers of repeating units,
m3 is an integer of 1 to 10,
n3 is an integer of 1 to 10, and
o3 is an integer of 1 to 500.

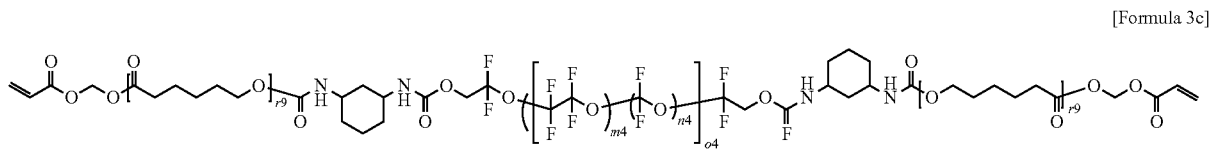

[Formula 3c]

wherein, in Formula 3c,
m4, n4, and o4 are the numbers of repeating units,
m4 is an integer of 1 to 10,
n4 is an integer of 1 to 10,
o4 is an integer of 1 to 500, and
r9 is an integer of 1 to 3.

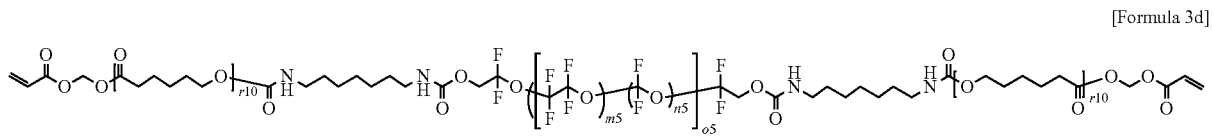

[Formula 3d]

wherein, in Formula 3d,
m5, n5, and o5 are the numbers of repeating units,
m5 is an integer of 1 to 10,
n5 is an integer of 1 to 10,
o5 is an integer of 1 to 500, and
r10 is an integer of 1 to 3.

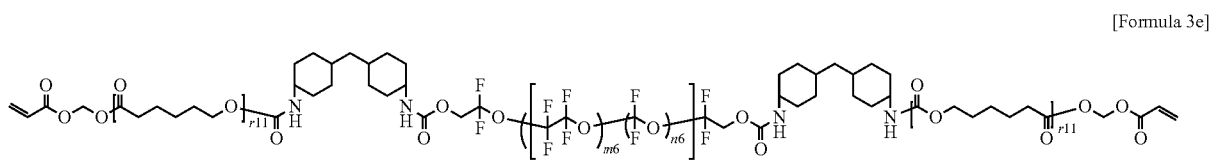

[Formula 3e]

wherein, in Formula 3e,
m6, n6, and o6 are the numbers of repeating units,
m6 is an integer of 1 to 10,
n6 is an integer of 1 to 10,
o6 is an integer of 1 to 500, and
r11 is an integer of 1 to 3.

[Formula 3f]

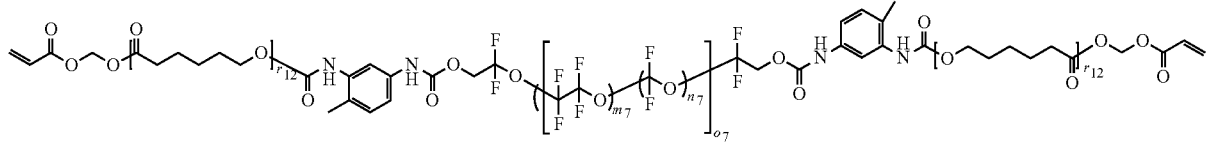

wherein, in Formula 3f,
m7, n7, and o7 are the numbers of repeating units,
m7 is an integer of 1 to 10,
n7 is an integer of 1 to 10,
o7 is an integer of 1 to 500, and
r12 is an integer of 1 to 3.

Also, the gel polymer electrolyte may further include unit C which is derived from at least one selected from the group consisting of methyl acrylate, methyl methacrylate, ethyl acrylate, ethyl methacrylate, propyl acrylate, propyl methacrylate, butyl acrylate, butyl methacrylate, hexyl acrylate, hexyl methacrylate, ethylhexyl acrylate, ethylhexyl methacrylate, 2,2,2-trifluoroethyl acrylate, 2,2,2-trifluoroethyl methacrylate, 2,2,3,3-tetrafluoropropyl acrylate, and 2,2,3,3-tetrafluoropropyl methacrylate.

In this case, the unit C may be included in an amount of 50 wt % or less based on a total amount of the first oligomer.

Furthermore, the gel polymer electrolyte may further include inorganic particles.

According to another aspect of the present invention, there is provided a composition for the gel polymer electrolyte of the present invention including:

a lithium salt, an electrolyte solution solvent, a polymerization initiator, and a first oligomer which includes unit A represented by Formula 1 and unit B represented by Formula 2.

The first oligomer may be included in an amount of 0.5 wt % to 20 wt % based on a total weight of the composition for the gel polymer electrolyte According to another aspect of the present invention, there is provided a lithium secondary battery including:

a positive electrode, a negative electrode, and a gel polymer electrolyte disposed between the positive electrode and the negative electrode, wherein the gel polymer electrolyte includes the gel polymer electrolyte of the present invention.

Advantageous Effects

Since a gel polymer electrolyte of the present invention includes a matrix polymer which is composed of an oligomer containing a fluorine-substituted polyether unit and at least one acrylate unit at the end, a degree of freedom of lithium (Li) ions is increased due to anion immobilization and stabilization, and thus, an effect of reducing battery resistance may be obtained to achieve high lithium ion conductivity. Also, since high-temperature durability is increased by a matrix polymer structure in the gel polymer electrolyte, a lithium secondary battery having more improved stability at high voltage and high temperature may be prepared.

MODE FOR CARRYING OUT THE INVENTION

Hereinafter, the present invention will be described in more detail to allow for a clearer understanding of the present invention.

It will be understood that words or terms used in the specification and claims shall not be interpreted as the meaning defined in commonly used dictionaries. It will be further understood that the words or terms should be interpreted as having a meaning that is consistent with their meaning in the context of the relevant art and the technical idea of the invention, based on the principle that an inventor may properly define the meaning of the words or terms to best explain the invention.

In the specification of the present invention, the expression "repeating unit" denotes a unit derived from a monomer formed by polymerization of the monomer. The repeating unit may be a unit directly formed by a polymerization reaction, or may be a unit having a part of the unit converted to another structure by treating the polymer.

Also, unless otherwise specified in the present invention, the expression "*" denotes the same or different atom or a portion connected between ends of a formula.

In general, a gel-type polymer electrolyte is disadvantageous in that it has poor high-voltage safety and mechanical properties in comparison to a solid polymer electrolyte, and also has lower battery resistance and resultant ionic conductivity than a liquid electrolyte. Thus, research into improving $Li^+$ ion conductivity as well as securing high-voltage stability by using a copolymer, such as an oligomer, has recently conducted. However, in a case in which an oligomer compound is used, the adjustment of physical properties may not only be facilitated, but the uniform formation of a polymer in a battery may also be difficult so that it may be difficult to be applied to a high-capacity and large battery.

Thus, the present invention attempts to address the above limitations by providing a gel polymer electrolyte including a matrix polymer which is formed by an oligomer compound prepared by polymerizing compounds having physical properties that may complement electrochemical properties and mechanical properties.

Specifically, in an embodiment of the present invention, provided is a gel polymer electrolyte including:

a matrix polymer; and an electrolyte solution impregnated in the matrix polymer, wherein the matrix polymer is formed in a three-dimensional network structure by polymerizing a first oligomer which includes unit A represented by the following Formula 1 and unit B represented by the following Formula 2.

[Formula 1]

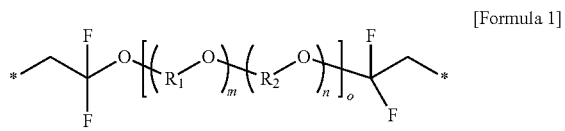

In Formula 1,
$R_1$ and $R_2$ are each independently a fluorine-substituted or unsubstituted alkylene group having 1 to 4 carbon atoms,
m, n, and o are the numbers of repeating units, m is an integer of 1 to 10,
n is an integer of 1 to 10, and
o is an integer of 1 to 500.

[Formula 2]

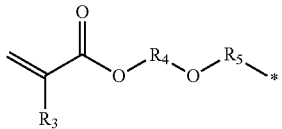

In Formula 2, $R_3$ is hydrogen, or an alkyl group having 1 to 6 carbon atoms, $R_4$ is an alkylene group having 1 to 6 carbon atoms, —$CH_2$—$R_6$—$CH_2$—, or —$CH_2$—$R_7$—O—$R_8$—$CH_2$—, wherein $R_6$, $R_7$, and $R_8$ are alkylene groups having 1 to 3 carbon atoms in which at least one acrylate group is substituted, $R_5$ is an alkylene group having 1 to 5 carbon atoms, or —(CO—$R_9$—O—)$_r$—CO—NH—$R_{10}$—NH—CO—O—, wherein $R_9$ is an alkylene group having 1 to 10 carbon atoms, and $R_{10}$ is an aliphatic, alicyclic, or aromatic hydrocarbon group, and r is an integer of 0 to 3.

Specifically, the aliphatic hydrocarbon group may include an alkylene group having 1 to 20 carbon atoms; an alkylene group having 1 to 20 carbon atoms which contains an isocyanate group (NCO); an alkoxylene group having 1 to 20 carbon atoms; an alkenylene group having 2 to 20 carbon atoms; or an alkynylene group having 2 to 20 carbon atoms, the alicyclic hydrocarbon group may include a substituted or unsubstituted cycloalkylene group having 4 to 20 carbon atoms; a substituted or unsubstituted cycloalkylene group having 4 to 20 carbon atoms which contains an isocyanate group (NCO); a cycloalkenylene group having 4 to 20 carbon atoms; or a heterocycloalkylene group having 2 to 20 carbon atoms, and the aromatic hydrocarbon group may include a substituted or unsubstituted arylene group having 6 to 20 carbon atoms; or a heteroarylene group having 2 to 20 carbon atoms.

First, in the gel polymer electrolyte according to the embodiment of the present invention, since the first oligomer includes the unit A which is derived from a monomer including a fluorine-substituted ether in a structure, an effect of reducing high-voltage safety and battery resistance may be achieved due to increases in anion stabilization and oxidation stability and a resultant effect of improving ionic conductivity may be achieved.

As a typical example, the unit represented by Formula 1 may include at least one selected from the group consisting of compounds represented by the following Formulae 1a to 1c.

[Formula 1a]

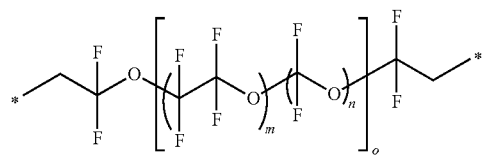

[Formula 1b]

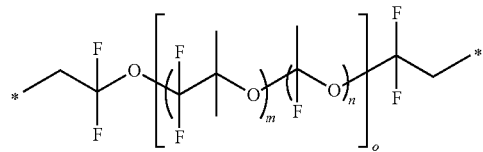

[Formula 1c]

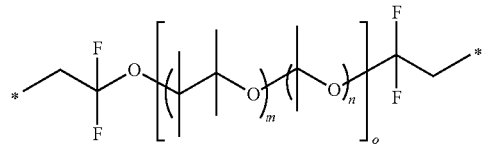

In Formulae 1a to 1c, m, n, and o are the numbers of repeating units, m is an integer of 1 to 10, n is an integer of 1 to 10, and o is an integer of 1 to 500, and, specifically, o is an integer of 1 to 100.

In this case, in the unit A represented by Formula 1, each of the n, m, and o denotes the number of repetitions, wherein the repeating units n, m, and o may be alternatingly, graftedly, or randomly arranged while having predetermined rules between one another or having no rules.

Also, in the gel polymer electrolyte according to the embodiment of the present invention, the first oligomer may include unit B represented by Formula 2 in order to improve mechanical properties by playing a role in forming the matrix polymer through a polymerization reaction.

Specifically, the unit B represented by Formula 2 may include at least one selected from the group consisting of compounds represented by the following Formulae 2a to 2l.

[Formula 2a]

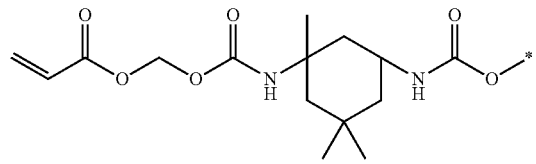

[Formula 2b]

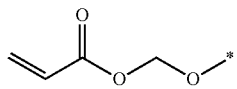

-continued
[Formula 2c]
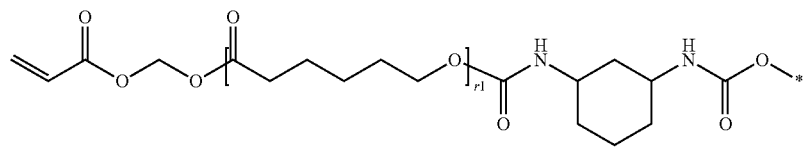
In Formula 2c,
r1 is an integer of 1 to 3.
[Formula 2d]
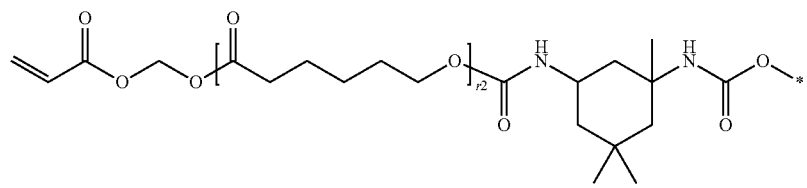
In Formula 2d,
r2 is an integer of 1 to 3.
[Formula 2e]
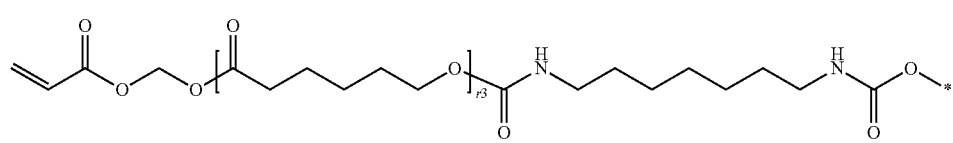
In Formula 2e,
r3 is an integer of 1 to 3.
[Formula 2f]
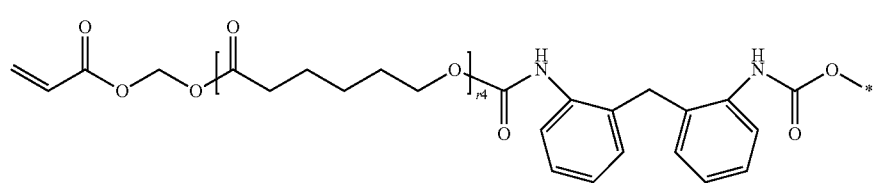
In Formula 2f,
r4 is an integer of 1 to 3.
[Formula 2g]
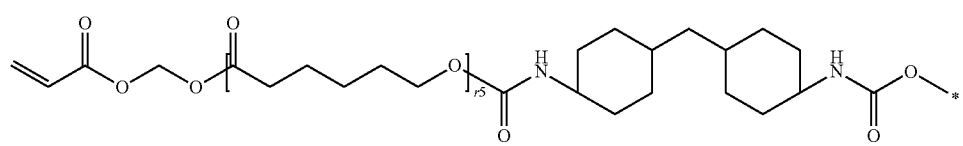
In Formula 2g,
r5 is an integer of 1 to 3.

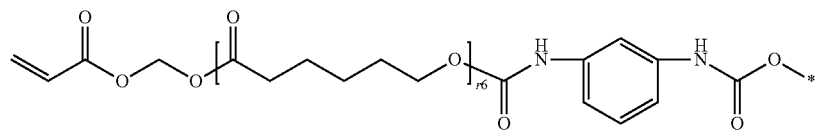
[Formula 2h]
In Formula 2h,
r6 is an integer of 1 to 3.
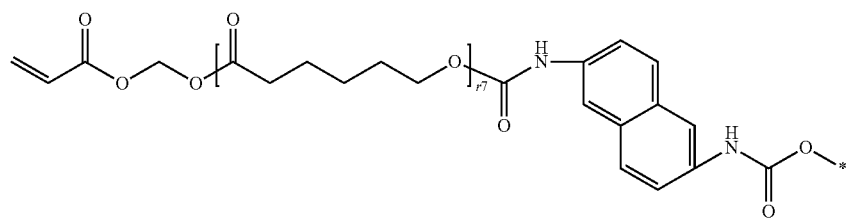
[Formula 2i]
In Formula 2i,
r7 is an integer of 1 to 3.
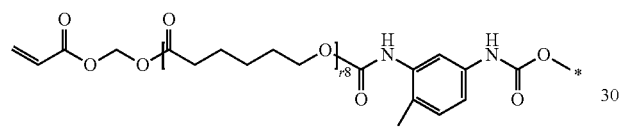
[Formula 2j]
In Formula 2j,
r8 is an integer of 1 to 3.
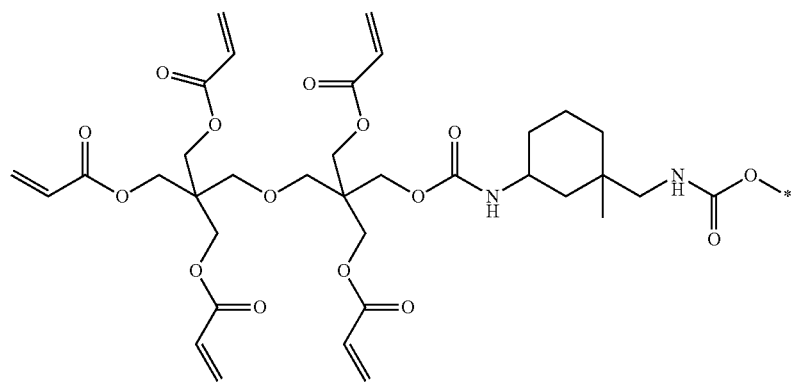
[Formula 2k]
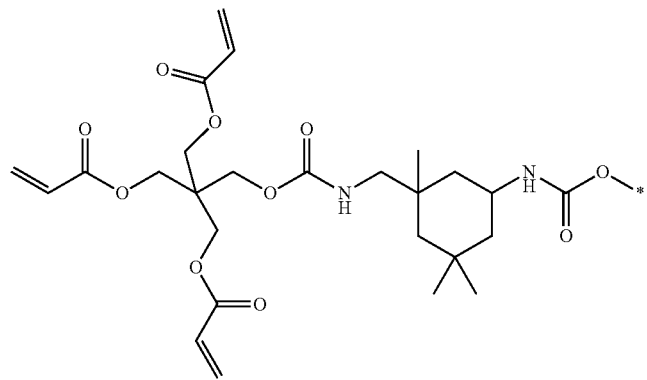
[Formula 2l]

In the gel polymer electrolyte of the present invention, as a typical example, the first oligomer may include a compound represented by Formula 3 below.

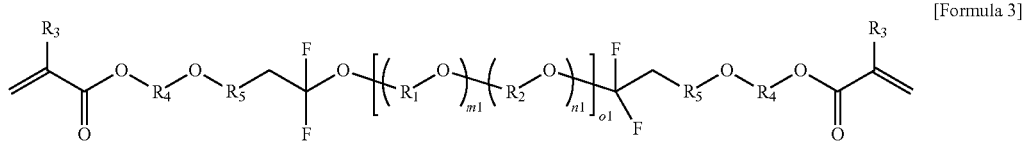

[Formula 3]

In Formula 3, $R_1$ and $R_2$ are each independently a fluorine-substituted or unsubstituted alkylene group having 1 to 4 carbon atoms, $R_3$ is hydrogen, or an alkyl group having 1 to 6 carbon atoms, $R_4$ is an alkylene group having 1 to 6 carbon atoms, —$CH_2$—$R_6$—$CH_2$—, or —$CH_2$—$R_7$—O—$R_8$—$CH_2$—, wherein $R_6$, $R_7$, and $R_8$ are alkylene groups having 1 to 3 carbon atoms in which at least one acrylate group is substituted, $R_5$ is an alkylene group having 1 to 5 carbon atoms, or —(CO—$R_9$—O—)$_r$—CO—NH—$R_{10}$—NH—CO—O—, wherein $R_9$ is an alkylene group having 1 to 10 carbon atoms, and $R_{10}$ is an aliphatic, alicyclic, or aromatic hydrocarbon group, m1, n1, and o1 are the numbers of repeating units, m1 is an integer of 1 to 10, n1 is an integer of 1 to 10, o1 is an integer of 1 to 500, and r is an integer of 1 to 3.

Specifically, as a typical example, the oligomer represented by Formula 3 may include at least one compound selected from the group consisting of compounds represented by the following Formulae 3a to 3f.

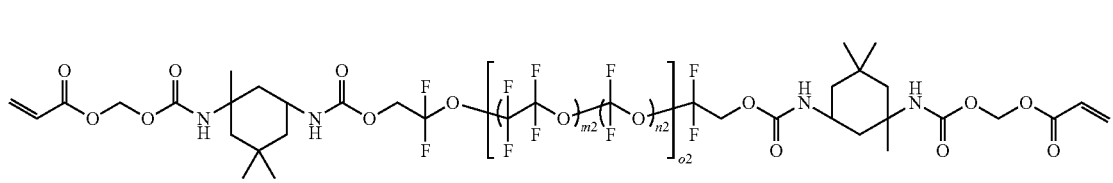

[Formula 3a]

In Formula 3a, m2, n2, and o2 are the numbers of repeating units, m2 is an integer of 1 to 10, n2 is an integer of 1 to 10, and o2 is an integer of 1 to 500.

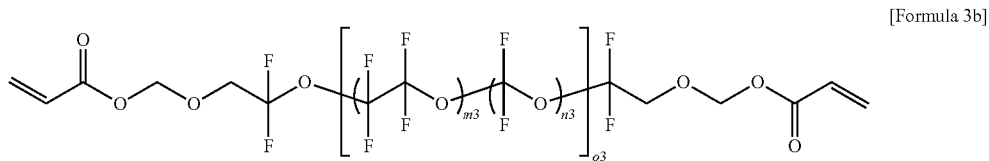

[Formula 3b]

In Formula 3b, m3, n3, and o3 are the numbers of repeating units, m3 is an integer of 1 to 10, n3 is an integer of 1 to 10, and o3 is an integer of 1 to 500.

[Formula 3c]

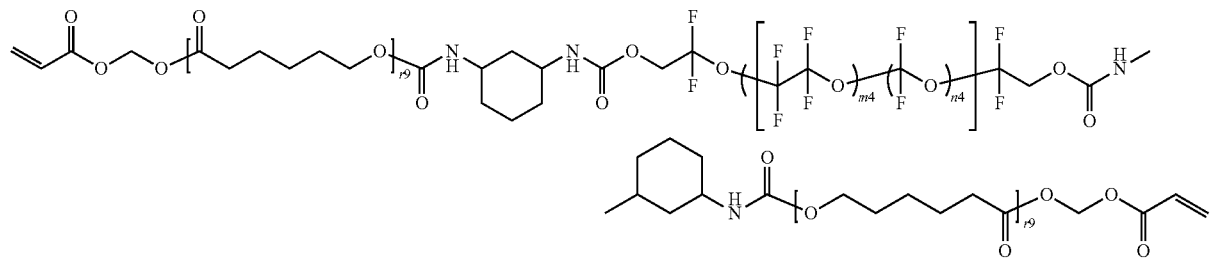

In Formula 3c,
m4, n4, and o4 are the numbers of repeating units,
m4 is an integer of 1 to 10,
n4 is an integer of 1 to 10,
o4 is an integer of 1 to 500, and
r9 is an integer of 1 to 3.

[Formula 3d]

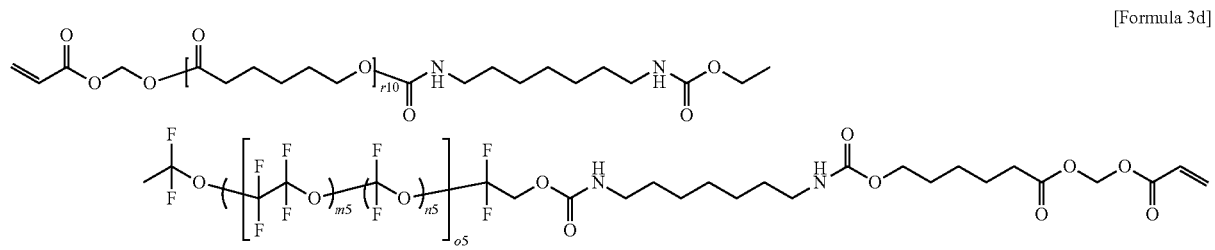

In Formula 3d,
m5, n5, and o5 are the numbers of repeating units,
m5 is an integer of 1 to 10,
n5 is an integer of 1 to 10,
o5 is an integer of 1 to 500, and
r10 is an integer of 1 to 3.

[Formula 3e]

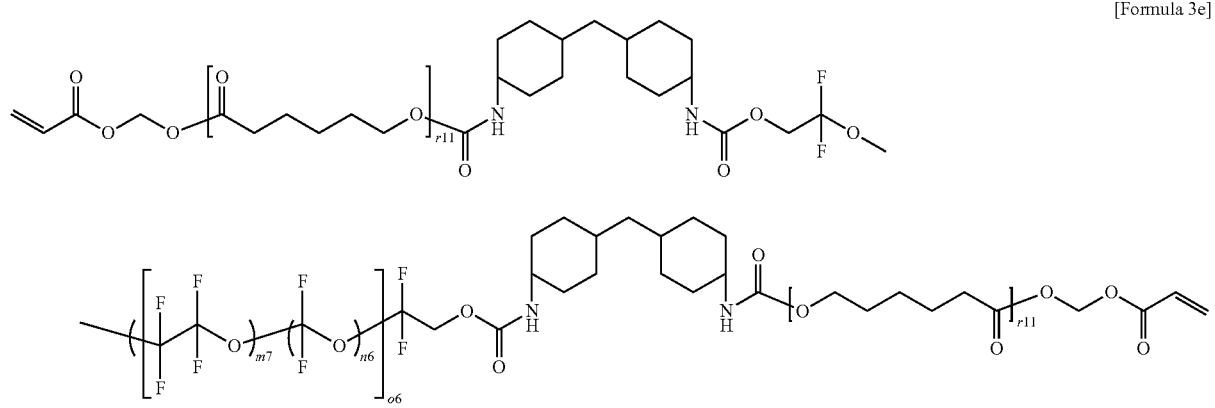

In Formula 3e,
m6, n6, and o6 are the numbers of repeating units,
m6 is an integer of 1 to 10,
n6 is an integer of 1 to 10,
o6 is an integer of 1 to 500, and
r11 is an integer of 1 to 3.

[Formula 3f]

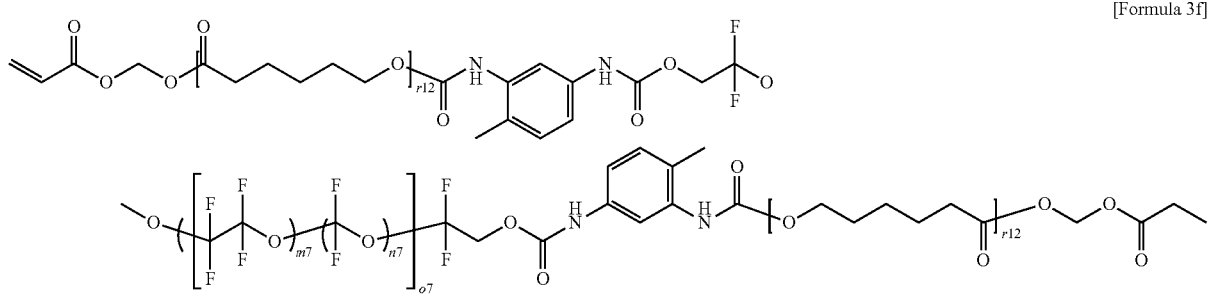

In Formula 3f,
m7, n7, and o7 are the numbers of repeating units,
m7 is an integer of 1 to 10,
n7 is an integer of 1 to 10,
o7 is an integer of 1 to 500, and
r12 is an integer of 1 to 3.

In the formation of the gel polymer electrolyte of the present invention, a ratio of the unit B:the unit A, which form the matrix polymer in the oligomer, is not particularly limited, but, specifically, a molar ratio of the unit B:the unit A may be in a range of 1:90 to 90:1.

A weight-average molecular weight of the oligomer for the formation of the gel polymer electrolyte of the present invention may be in a range of about 1,000 g/mol to about 100,000 g/mol, for example, 1,000 g/mol to 50,000 g/mol. In a case in which the weight-average molecular weight of the oligomer is within the above range, mechanical properties of a battery including the oligomer may be effectively improved.

In a case in which the weight-average molecular weight of the copolymer is within the above range, electrochemical stability as well as mechanical properties and processability (formability) may be secured. In this case, in the unit A represented by Formula 1, m, n, and o may be appropriately changed within the above range depending on the weight-average molecular weight of the copolymer.

In this case, the weight-average molecular weight may be measured using gel permeation chromatography (GPC). For example, a sample having a predetermined concentration is prepared, and Alliance 4, a GPC measurement system, is then stabilized. When the system is stabilized, a standard sample and the sample are injected into the system to obtain a chromatogram, and a molecular weight is then calculated using an analytical method (system: Alliance 4, Column: Ultrahydrogel linear x2, eluent: 0.1 M $NaNO_3$ (pH 7.0 phosphate buffer, flow rate: 0.1 mL/min, temp: 40° C., injection: 100 μL)).

Also, in order to further improve mechanical strength and hardening effect, the gel polymer electrolyte of the present invention may further include unit C which is derived from at least one selected from the group consisting of methyl acrylate, methyl methacrylate, ethyl acrylate, ethyl methacrylate, propyl acrylate, propyl methacrylate, butyl acrylate, butyl methacrylate, hexyl acrylate, hexyl methacrylate, ethylhexyl acrylate, ethylhexyl methacrylate, 2,2,2-trifluoroethyl acrylate, 2,2,2-trifluoroethyl methacrylate, 2,2,3,3-tetrafluoropropyl acrylate, and 2,2,3,3-tetrafluoropropyl methacrylate.

In this case, the unit C may be included in an amount of 50 wt % or less, for example, 20 wt % or less, based on a total amount of the first oligomer. In a case in which the amount of the unit C is greater than 50 wt %, since the oligomer is excessively included to increase the resistance, cycle characteristics may be degraded.

In a case in which a coating type gel polymer electrolyte is implemented with the gel polymer electrolyte of the present invention, the matrix polymer may further contain inorganic particles in an amount of 5 parts by weight to 700 parts by weight, for example, 100 parts by weight to 400 parts by weight, based on 100 parts by weight of the first oligomer.

In order to effectively improve increases in electrode and interfacial resistance, the inorganic particles may be included in an amount of 700 parts by weight or less. In a case in which the inorganic particles are included in an amount of greater than 700 parts by weight, since pores are formed in the electrolyte, an effect of ionic conductivity may be reduced. In a case in which the amount of the inorganic particles is less than 5 parts by weight, an effect of improving electrochemical stability as well as securing mechanical properties is insignificant.

The inorganic particles are impregnated in the matrix polymer and thus, may allow a high-viscosity solvent to be well permeated through pores which are formed by spaces between the inorganic particles. That is, since the inorganic particles are included, an effect of further improving wettability to the high-viscosity solvent due to affinity between polar materials and a capillary phenomenon may be obtained.

Inorganic particles, in which permittivity is high and an oxidation and/or reduction reaction does not occur in an operating voltage range (for example, 0 to 5 V based on $Li/Li^+$) of the lithium secondary battery, may be used as the above inorganic particles.

Specifically, typical examples of the inorganic particles may be a single material selected from the group consisting of $BaTiO_3$, $BaTiO_3$, $Pb(Zr,Ti)O_3$ (PZT), $Pb_{1-x}La_xZr_{1-y}Ti_yO_3$ (PLZT, where $0<x<1$, $0<y<1$), $Pb(Mg_{1/3}Nb_{2/3})O_3$—$PbTiO_3$ (PMN-PT), hafnia ($HfO_2$), $SrTiO_3$, $SnO_2$, $CeO_2$, MgO, NiO, CaO, ZnO, $ZrO_2$, $Y_2O_3$, $Al_2O_3$, $TiO_2$, SiC, lithium phosphate ($Li_3PO_4$), lithium titanium phosphate ($Li_{x1}Ti_{y1}(PO_4)_3$, $0<x1<2$, $0<y1<3$), lithium aluminum titanium phosphate ($Li_{x2}Al_{y2}Ti_{z2}(PO_4)_3$, $0<x2<2$, $0<y2<1$, $0<z2<3$), $(LiAlTiP)_{x3}O_{y3}$-based glass ($0<x3<4$, $0<y3<13$) such as $14Li_2O$—$9Al_2O_3$-$38TiO_2$-$39P_2O_5$, lithium lanthanum titanate ($Li_{24}La_{y4}TiO_3$, $0<x4<2$, $0<y4<3$), lithium germanium thiophosphate ($Li_{x5}Ge_{y5}P_zS_w$, $0<x5<4$, $0<y5<1$, $0<z<1$, $0<w<5$) such as $Li_{3.25}Ge_{0.25}P_{0.75}S_4$, lithium nitride ($Li_{x6}N_{y6}$, $0<x6<4$, $0<y6<2$) such as $Li_3N$, $SiS_2$-based glass ($Li_{x7}Si_{y7}S_{z2}$, $0<x7<3$, $0<y7<2$, $0<z3<4$) such as $Li_3PO_4$—$Li_2S$—$SiS_2$, $P_2S_5$-based glass ($Li_{x8}P_{y8}S_{z3}$, $0<x8<3$, $0<y8<3$, $0<z3<7$), such as LiI—$Li_2S$—$P_2S_5$, and lithium lanthanum zirconium oxide (LLZO, $Li_7La_3Zr_2O_{12}$), or a mixture of two or more thereof. Specifically, the inorganic particles may include LLZO.

Also, in addition to the inorganic particles, the matrix polymer may further include a mixture thereof.

An average particle diameter of the inorganic particles may be in a range of about 0.001 µm to about 10 µm so as to provide adequate porosity with uniform thickness in the gel polymer electrolyte. In a case in which the average particle diameter is less than 0.001 µm, dispersibility may be reduced. In a case in which the average particle diameter is greater than 10 µm, the thickness of a porous coating layer may not only be increased, but a phenomenon may also occur in which the inorganic particles are agglomerated. Thus, the mechanical strength may be reduced while the inorganic particles are exposed to the outside of the gel polymer electrolyte.

The gel polymer electrolyte of the present invention as described above may have a $Li^+$ ion conductivity of $2.5\times 10^{-4}$ S/cm or more when measured at a temperature of 25° C. by an impedance measurement and analysis system.

In this case, the prepared gel polymer electrolyte was sandwiched between a pair of platinum electrode discs having a diameter of 1 cm. The ionic conductivity of the gel polymer electrolyte in this state was measured by an alternating current impedance method. Model VMP3 from Bio-Logic SAS was used as a measurement instrument, and the measurement was performed at room temperature under a frequency range of 0.1 Hz to 10,000 Hz with an amplitude of 10 mV.

Also, the gel polymer electrolyte may have a $Li^+$ ion transfer coefficient of 0.3 or more based on nuclear magnetic resonance (NMR) measurement at a temperature of 25° C. In this case, the $Li^+$ ion transfer coefficient may be defined as $Li^+$ ion diffusivity/($Li^+$ ion diffusivity+anion diffusivity), and the $Li^+$ ion diffusivity and the anion diffusivity may be measured by the following equipment and methods.

For example, Varian 500 MHz NMR/dual probe was used, the $Li^+$ ion diffusivity (cation diffusion constant) was measured using $^7Li$ diffusion NMR, and the anion diffusivity (anion diffusion constant) was measured using $^{19}F$ diffusion NMR. A solvent used in this case was acetone-$d_6$, and, in order to measure a diffusion value of a sample itself, an inner tube (acetone-$d_6$) was used to prevent the mixing of the sample and the deuterium solvent. Also, as a pulse sequence in the measurement experiment, stimulated echo with gradient pulse was used. A gradient amplitude was adjusted so that a peak intensity of the maximum gradient power was about 2% to about 5% of a peak intensity of the minimum gradient power, this range was divided into 16 steps in the same manner as solution NMR, and 16 different amplitudes were applied to each sample.

Furthermore, the gel polymer electrolyte may have a gel content of about 1 wt % or more, for example, about 20 wt % or more, at a temperature of 25° C.

Also, the gel polymer electrolyte may have an amount of the unreacted oligomer of 20% or less based on a total input of the reactive oligomer at a temperature of 25° C.

In this case, the gel polymer electrolyte is obtained, the gel polymer electrolyte is then solvent (acetone)-extracted, and subsequently, the amount of the unreacted oligomer may be confirmed by the NMR measurement of the extracted solvent.

In the gel polymer electrolyte of the present invention, the electrolyte solution impregnated in the matrix polymer is composed of a typical lithium salt-containing non-aqueous solvent, and, in this case, the lithium salt may include any one selected from the group consisting of $LiPF_6$, $LiBF_4$, $LiSbF_6$, $LiAsF_6$, $LiClO_4$, $LiN(C_2F_5SO_2)_2$, $LiN(CF_3SO_2)_2$, $CF_3SO_3Li$, $LiC(CF_3SO_2)_3$, $LiC_4BO_8$, LiTFSI, LiFSI, and $LiClO_4$, or a mixture of two or more thereof, but the present invention is not limited thereto.

The lithium salt may be included at a concentration of 1 M to 2 M in the electrolyte solution, or may be included in an amount of 10 wt % to 50 wt % based on a total amount of the oligomer.

Also, a non-aqueous solvent typically used in an electrolyte solution for a lithium secondary battery may be used as the electrolyte solution solvent of the present invention, and, as a typical example, at least one compound of a cyclic carbonate-based compound, a linear carbonate-based compound, an alkyl ether-based compound, an alkyl acetate-based compound, an alkyl propionate-based compound, and a nitrile-based compound may be included.

In this case, examples of the cyclic carbonate-based compound may be at least one selected from the group consisting of ethylene carbonate (EC), propylene carbonate (PC), butylene carbonate (BC), and fluoroethylene carbonate (FEC).

The linear carbonate-based compound may include at least one selected from the group consisting of dimethyl carbonate (DMC), diethyl carbonate (DEC), dipropyl carbonate, ethylmethyl carbonate (EMC), methylpropyl carbonate, and ethylpropyl carbonate.

The alkyl ether-based compound may include at least one selected from the group consisting of dimethyl ether, diethyl ether, dipropyl ether, methylethyl ether, methylpropyl ether, and ethylpropyl ether.

The alkyl acetate-based compound may include at least one selected from the group consisting of methyl acetate, ethyl acetate, and propyl acetate.

The alkyl propionate-based compound may include at least one selected from the group consisting of methyl propionate, ethyl propionate, propyl propionate, and butyl propionate.

The nitrile-based compound may include at least one selected from the group consisting of acetonitrile, propionitrile, butyronitrile, valeronitrile, caprylonitrile, heptanenitrile, cyclopentane carbonitrile, cyclohexane carbonitrile, 2-fluorobenzonitrile, 4-fluorobenzonitrile, difluorobenzonitrile, trifluorobenzonitrile, phenylacetonitrile, 2-fluorophenylacetonitrile, and 4-fluorophenylacetonitrile.

In particular, since ethylene carbonate and propylene carbonate, as cyclic carbonates among the carbonate-based electrolyte solution solvents, are highly viscous organic solvents and have high dielectric constants, the ethylene carbonate and propylene carbonate may well dissociate the lithium salt in the electrolyte solution. Thus, the ethylene carbonate and propylene carbonate may be used. Since an electrolyte solution having high electrical conductivity may be prepared when the above cyclic carbonate is mixed with low viscosity, low dielectric constant linear carbonate, such as ethylmethyl carbonate, diethyl carbonate, or dimethyl carbonate, in an appropriate ratio, the ethylene carbonate and propylene carbonate, for example, may be used.

Also, the performance of the electrolyte solution solvent may be improved by adding a typical additive which is used in the electrolyte solution. For example, the electrolyte solution solvent may further include a typical additive, such as vinylene carbonate (VC), 1,3-propene sultone (PS), succinonitrile (SN), ethylene sulfate (ESa), 1,3-propane sultone (PRS), fluoroethylene carbonate (FEC), adiponitrile (AND), $LiPO_2F_2$, lithium difluoro(oxalato) borate (LiODFB), lithium bis(oxalato)borate (LiBOB), (trimethoxysilyl)propyl phosphate (TMSPa), (trimethoxysilyl)propyl phosphite (TMSPi), TFEPa, and TFEPi, without limitation.

With respect to a typical electrolyte, metal ions dissolved from a positive electrode are precipitated at a negative electrode. In contrast, since the gel polymer electrolyte of the present invention includes the matrix polymer formed by the oligomer, effects of increasing high-voltage safety and reducing battery resistance and a resultant effect of improving ionic conductivity as well as mechanical properties may be obtained. Thus, a lithium secondary battery having improved life characteristics and capacity characteristics may be prepared. In addition, the gel polymer electrolyte of the present invention may form a protective layer, which is composed of a polymer, on the surfaces of the positive electrode and negative electrode, or may suppress a side reaction by anion stabilization and may increase adhesion between the electrodes by using a polymer structure. Thus, the gel polymer electrolyte of the present invention may suppress the generation of gas in the battery at high temperature. Also, the strengthening of the separator through the gel polymer, the consequent improvement of penetration safety, and the improvement of stability, for example, flame retardancy and overcharge through the reduction of volatility, may be achieved.

Also, in another embodiment of the present invention, provided is a composition for a gel polymer electrolyte including:

a lithium salt;
an electrolyte solution solvent;
a polymerization initiator; and
a first oligomer which includes unit A represented by Formula 1 and unit B represented by Formula 2.

The first oligomer may be included in an amount of 0.5 wt % to 20 wt %, for example, 0.5 wt % to 10 wt %, based on a total weight of the composition for a gel polymer electrolyte. In a case in which the amount of the first oligomer is less than 0.5 wt %, since gelation may be difficult, characteristics of the gel polymer electrolyte may be difficult to be achieved. In a case in which the amount of the oligomer is greater than 20 wt %, since the resistance may be increased due to the excessive amount of the oligomer, battery performance may be degraded.

Furthermore, in the present invention, the gel polymer electrolyte of the present invention may be prepared from the composition for a gel polymer electrolyte by using a conventionally known polymerization method.

A typical polymerization initiator known in the art may be used as the polymerization initiator used for the above reaction.

Non-limiting examples of the polymerization initiator may be organic peroxides or hydroperoxides, such as benzoyl peroxide, acetyl peroxide, dilauryl peroxide, di-tert-butyl peroxide, t-butyl peroxy-2-ethyl-hexanoate, cumyl hydroperoxide, and hydrogen peroxide, and azo compounds such as 2,2'-azobis(2-cyanobutane), 2,2'-azobis(methylbutyronitrile), 2,2'-azobis(iso-butyronitrile) (AIBN), and 2,2'-azobis(dimethylvaleronitrile) (AMVN), but the present invention is not limited thereto.

The polymerization initiator may be dissociated by heat in the battery, for a non-limiting example, at a temperature of 30° C. to 100° C. or may be dissociated at room temperature (5° C. to 30° C.) to form a radical, and a polymerizable monomer may be reacted with an acrylate-based compound by free radical polymerization to form a gel polymer electrolyte.

Also, the polymerization initiator may be used in an amount of 0.01 part by weight to 20 parts by weight based on 100 parts by weight of the oligomer. In a case in which the amount of the polymerization initiator is greater than 20 parts by weight, the gelation may occur too quickly during the injection of the composition for a gel polymer electrolyte into the battery or the unreacted initiator may remain to adversely affect the battery performance afterwards. In contrast, in a case in which the amount of the polymerization initiator is less than 0.01 part by weight, the gelation may not be well performed.

As described above, the lithium salt may include any one selected from the group consisting of $LiPF_6$, $LiBF_4$, $LiSbF_6$, $LiAsF_6$, $LiClO_4$, $LiN(C_2F_5SO_2)_2$, $LiN(CF_3SO_2)_2$, $CF_3SO_3Li$, $LiC(CF_3SO_2)_3$, $LiC_4BO_8$, LiTFSI, LiFSI, and $LiClO_4$, or a mixture of two or more thereof, but the present invention is not limited thereto.

Also, as described above, a non-aqueous solvent typically used in an electrolyte solution for a lithium secondary battery may be used as the electrolyte solution solvent, and, for example, at least one compound of a cyclic carbonate-based compound, a linear carbonate-based compound, an alkyl ether-based compound, an alkyl acetate-based compound, an alkyl propionate-based compound, and a nitrile-based compound may be included.

Among these compounds, cyclic carbonate, linear carbonate, or a carbonate compound as a mixture thereof may be typically included.

Furthermore, in order to further provide performances such as effects of increasing the efficiency of the gel reaction and decreasing the resistance, the composition for a gel polymer electrolyte according to the embodiment of the present invention may selectively further include other additives known in the art which may achieve the above physical properties, in addition to the above-described components.

As described above, a typical additive, such as VC, VEC, PS, SN, AdN, ESa, PRS, FEC, $LiPO_2F_2$, LiODFB, LiBOB, TMSPa, TMSPi, TFEPa, and TFEPi, may be used as the above additive.

In another embodiment of the present invention, provided is a lithium secondary battery including:

a positive electrode and a negative electrode, and
a polymer electrolyte disposed between the positive electrode and the negative electrode,
wherein the polymer electrolyte includes the gel polymer electrolyte of the present invention.

The gel polymer electrolyte is formed by polymerizing the composition for a gel polymer electrolyte according to a typical method known in the art. For example, the gel polymer electrolyte may be formed by in-situ polymerization of the composition for a gel polymer electrolyte in the secondary battery.

According to an exemplary embodiment of the present invention, (a) inserting an electrode assembly composed of a positive electrode, a negative electrode, and a separator disposed between the positive electrode and the negative electrode into a battery case, and (b) injecting the composition for a gel polymer electrolyte according to the present invention into the battery case and polymerizing the composition to form a gel polymer electrolyte may be included.

An in-situ polymerization reaction in the lithium secondary battery may be performed by using E-beam, γ-ray, and room temperature/high temperature aging processes, and, according to an embodiment of the present invention, the in-situ polymerization reaction may be performed by heat polymerization. In this case, polymerization time required may be in a range of about 2 minutes to about 12 hours, and heat polymerization temperature may be in a range of 30° C. to 100° C.

Specifically, in the in-situ polymerization reaction in the lithium secondary battery, predetermined amounts of a polymerization initiator and the oligomer are added to an electrolyte solution containing a lithium salt and mixed, and the mixture is then injected into a battery cell. When an electrolyte injection hole of the battery cell is sealed and polymerization is then performed by heating the battery cell to 40° C. to 80° C. for 1 hour to 20 hours, a gel polymer electrolyte in the form of a gel is prepared through the gelation of the lithium salt-containing electrolyte solution.

The lithium secondary battery according to the embodiment of the present invention has a charge voltage ranging from 3.0 V to 5.0 V, and thus, capacity characteristics of the lithium secondary battery may be excellent in both normal and high voltage ranges.

According to an embodiment of the present invention, an electrode constituting the lithium secondary battery may be prepared by a typical method known in the art. For example, a binder, a conductive agent, and a dispersant, if necessary, as well as a solvent are mixed with an electrode active material and stirred to prepare a slurry, and a metal current collector is then coated with the slurry and pressed. Thereafter, the electrode may be prepared by drying the coated metal current collector.

The positive electrode may be prepared by forming a positive electrode material mixture layer on a positive electrode collector. The positive electrode material mixture layer may be formed by coating the positive electrode collector with a positive electrode slurry including a positive electrode active material, a binder, a conductive agent, and a solvent, and then drying and rolling the coated positive electrode collector.

The positive electrode collector is not particularly limited so long as it has conductivity without causing adverse chemical changes in the battery, and, for example, stainless steel, aluminum, nickel, titanium, fired carbon, or aluminum or stainless steel that is surface-treated with one of carbon, nickel, titanium, silver, or the like may be used.

The positive electrode active material is a compound capable of reversibly intercalating and deintercalating lithium, wherein the positive electrode active material may specifically include a lithium composite metal oxide including lithium and at least one metal such as cobalt, manganese, nickel, or aluminum. Specifically, the lithium composite metal oxide may include lithium-manganese-based oxide (e.g., $LiMnO_2$, $LiMn_2O_4$, etc.), lithium-cobalt-based oxide (e.g., $LiCoO_2$, etc.), lithium-nickel-based oxide (e.g., $LiNiO_2$, etc.), lithium-nickel-manganese-based oxide (e.g., $LiNi_{1-Y9}Mn_{Y9}O_2$ (where $0<Y9<1$), $LiMn_{2-Z4}Ni_{Z4}O_4$ (where $0<Z4<2$), etc.), lithium-nickel-cobalt-based oxide (e.g., $LiNi_{1-Y10}Co_{Y10}O_2$ (where $0<Y10<1$), lithium-manganese-cobalt-based oxide (e.g., $LiCo_{1-Y11}Mn_{Y11}O_2$ (where $0<Y11<1$), $LiMn_{2-Z5}CO_{Z5}O_4$ (where $0<Z5<2$), etc.), lithium-nickel-manganese-cobalt-based oxide (e.g., $Li(Ni_aCo_bMn_c)O_2$ (where $0<a<1$, $0<b<1$, $0<c<1$, and $a+b+c=1$) or $Li(Ni_{a1}Co_{b1}Mn_{c1})O_4$ (where $0<a1<2$, $0<b1<2$, $0<c1<2$, and $a1+b1+c1=2$), etc.), or lithium-nickel-cobalt-transition metal (M) oxide (e.g., $Li(Ni_{a2}Co_{b2}Mn_{c2}M_d)O_2$ (where M is selected from the group consisting of aluminum (Al), iron (Fe), vanadium (V), chromium (Cr), titanium (Ti), tantalum (Ta), magnesium (Mg), and molybdenum (Mo), and a2, b2, c2, and d are atomic fractions of each independent elements, wherein $0<a2<1$, $0<b2<1$, $0<c2<1$, $0<d<1$, and $a2+b2+c2+d=1$), etc.), and any one thereof or a compound of two or more thereof may be included.

Among these materials, in terms of the improvement of capacity characteristics and stability of the battery, the lithium composite metal oxide may include $LiCoO_2$, $LiMnO_2$, $LiNiO_2$, lithium nickel manganese cobalt oxide (e.g., $Li(Ni_{1/3}Mn_{1/3}CO_{1/3})O_2$, $Li(Ni_{0.6}Mn_{0.2}Co_{0.2})O_2$, $Li(Ni_{0.5}Mn_{0.3}Co_{0.2})O_2$, $Li(Ni_{0.7}Mn_{0.15}Co_{0.15})O_2$, or $Li(Ni_{0.8}Mn_{0.1}Co_{0.1})O_2$), or lithium nickel cobalt aluminum oxide (e.g., $LiNi_{0.8}Co_{0.15}Al_{0.05}O_2$, etc.).

The positive electrode active material may be included in an amount of 80 wt % to 99 wt % based on a total weight of solid content in the positive electrode slurry.

The binder is a component that assists in the binding between the active material and the conductive agent and in the binding with the current collector, wherein the binder is commonly added in an amount of 1 wt % to 30 wt % based on the total weight of the solid content in the positive electrode slurry. Examples of the binder may be polyvinylidene fluoride (PVDF), polyvinyl alcohol, carboxymethylcellulose (CMC), starch, hydroxypropylcellulose, regenerated cellulose, polyvinylpyrrolidone, tetrafluoroethylene, polyethylene, polypropylene, an ethylene-propylene-diene terpolymer (EPDM), a sulfonated EPDM, a styrene-butadiene rubber, a fluoro rubber, various copolymers, and the like.

The conductive agent is commonly added in an amount of 1 wt % to 30 wt % based on the total weight of the solid content in the positive electrode slurry.

Any conductive agent may be used without particular limitation so long as it has conductivity without causing adverse chemical changes in the battery, and, for example, a conductive material such as: graphite; a carbon-based material such as carbon black, acetylene black, Ketjen black, channel black, furnace black, lamp black, and thermal black; conductive fibers such as carbon fibers or metal fibers; metal powder such as fluorocarbon powder, aluminum powder, and nickel powder; conductive whiskers such as zinc oxide whiskers and potassium titanate whiskers; conductive metal oxide such as titanium oxide; or polyphenylene derivatives may be used. Specific examples of a commercial conductive agent may include acetylene black-based products (Chevron Chemical Company, Denka black (Denka Singapore Private Limited), or Gulf Oil Company), Ketjen black, ethylene carbonate (EC)-based products (Armak Company), Vulcan XC-72 (Cabot Company), and Super P (Timcal Graphite & Carbon).

The solvent may include an organic solvent, such as N-methyl-2-pyrrolidone (NMP), and may be used in an amount such that desirable viscosity is obtained when the positive electrode active material as well as selectively the binder and the conductive agent are included. For example, the solvent may be included so that a concentration of the solid content in the slurry including the positive electrode active material as well as selectively the binder and the conductive agent is in a range of 40 wt % to 60 wt %, for example, 40 wt % to 50 wt %.

Also, the negative electrode may be prepared by forming a negative electrode material mixture layer on a negative electrode collector. The negative electrode material mixture layer may be formed by coating the negative electrode collector with a negative electrode slurry including a negative electrode active material, a binder, a conductive agent, and a solvent, and then drying and rolling the coated negative electrode collector.

The negative electrode collector generally has a thickness of 3 μm to 500 μm. The negative electrode collector is not particularly limited so long as it has high conductivity without causing adverse chemical changes in the battery, and, for example, copper, stainless steel, aluminum, nickel, titanium, fired carbon, copper or stainless steel that is surface-treated with one of carbon, nickel, titanium, silver, or the like, an aluminum-cadmium alloy, or the like may be used. Also, similar to the positive electrode collector, the negative electrode collector may have fine surface roughness to improve bonding strength with the negative electrode active material, and may be used in various shapes such as a film, a sheet, a foil, a net, a porous body, a foam body, a non-woven fabric body, and the like.

Furthermore, the negative electrode active material may include a single material selected from the group consisting of a lithium-containing titanium composite oxide (LTO); a carbon-based material such as non-graphitizable carbon and graphite-based carbon; a complex metal oxide such as $Li_{x1}Fe_2O_3$ (0≤x10≤1), $Li_{x11}WO_2$ (0≤x11≤1), $Sn_{x12}Me_{1-x12}Me'_{y12}O_z$ (Me: manganese (Mn), iron (Fe), lead (Pb), or germanium (Ge); Me': aluminum (Al), boron (B), phosphorus (P), silicon (Si), Groups I, II and III elements of the periodic table, or halogen; 0<x12≤1; 1y12≤3; 1z12≤8); a lithium metal; a lithium alloy; a silicon-based alloy; a tin-based alloy; a metal oxide such as SnO, $SnO_2$, PbO, $PbO_2$, $Pb_2O_3$, $Pb_3O_4$, $Sb_2O_3$, $Sb_2O_4$, $Sb_2O_5$, GeO, $GeO_2$, $Bi_2O_3$, $Bi_2O_4$, and $Bi_2O_5$; and a conductive polymer such as polyacetylene, or a mixture of two or more thereof.

The negative electrode active material may be included in an amount of 80 wt % to 99 wt % based on a total weight of solid content in the negative electrode slurry.

The binder is a component that assists in the binding between the conductive agent, the active material, and the current collector, wherein the binder is commonly added in an amount of 1 wt % to 30 wt % based on the total weight of the solid content in the negative electrode slurry. Examples of the binder may be polyvinylidene fluoride (PVDF), polyvinyl alcohol, carboxymethylcellulose (CMC), starch, hydroxypropylcellulose, regenerated cellulose, polyvinylpyrrolidone, tetrafluoroethylene, polyethylene, polypropylene, an ethylene-propylene-diene polymer (EPDM), a sulfonated EPDM, a styrene-butadiene rubber, a fluoro rubber, and various copolymers thereof.

The conductive agent is a component for further improving the conductivity of the negative electrode active material, wherein the conductive agent may be added in an amount of 1 wt % to 20 wt % based on the total weight of the solid content in the negative electrode slurry. Any conductive agent may be used without particular limitation so long as it has conductivity without causing adverse chemical changes in the battery, and, for example, a conductive material such as: graphite such as natural graphite or artificial graphite; carbon black such as acetylene black, Ketjen black, channel black, furnace black, lamp black, and thermal black; conductive fibers such as carbon fibers and metal fibers; metal powder such as fluorocarbon powder, aluminum powder, and nickel powder; conductive whiskers such as zinc oxide whiskers and potassium titanate whiskers; conductive metal oxide such as titanium oxide; or polyphenylene derivatives may be used.

The solvent may include water, or an organic solvent, such as N-methyl-2-pyrrolidone (NMP) and alcohol, and may be used in an amount such that desirable viscosity is obtained when the negative electrode active material as well as selectively the binder and the conductive agent is included. For example, the solvent may be included so that a concentration of the solid content in the slurry including the negative electrode active material as well as selectively the binder and the conductive agent is in a range of 50 wt % to 75 wt %, for example, 50 wt % to 65 wt %.

Next, a separator is selectively introduced between the positive electrode and the negative electrode.

The separator plays a role in blocking an internal short circuit between both electrodes and impregnating the electrolyte, wherein, after a separator composition is prepared by mixing a polymer resin, a filler, and a solvent, the separator composition is directly coated on the electrode and dried to form a separator film, or, after the separator composition is cast on a support and dried, the separator may be prepared by laminating a separator film peeled from the support on the electrode.

The polymer resin is not particularly limited, but, for example, an olefin-based polymer such as chemical resistant and hydrophobic polypropylene; a composite porous separator in which an inorganic material is added to a porous separator base material; and a sheet or nonwoven fabric formed of glass fibers or polyethylene are used.

The porous separator may generally have a pore diameter of 0.01 μm to 50 μm and a porosity of 5% to 95%. Also, the porous separator may generally have a thickness of 5 μm to 300 μm.

A shape of the lithium secondary battery according to the embodiment of the present invention is not particularly limited, but, for example, a cylindrical type using a can, a prismatic type, a pouch type, or a coin type may be used.

In another embodiment of the present invention, there is further provided an electrochromic device including:

a first electrode, a second electrode, an electrochromic material, and the gel polymer electrolyte of the present invention.

In this case, the first electrode and the second electrode have a structure in which a transparent conductive layer is formed on a base material, and the electrochromic device may include a flexible substrate and a rigid substrate on opposite sides of the electrolyte.

Thus, in a case in which the gel polymer electrolyte of the present invention is used for the flexibility and durability of the electrochromic device and a degree of freedom in design, ionic conductivity required for driving the device and the durability may be secured.

In this case, the base material and the transparent conductive layer are not particularly limited as long as they are known in the art. Examples of the base material may be glass and transparent plastic (polymer), and examples of a conductive material for the formation of the transparent conductive layer may be indium doped tin oxide (ITO), antimony doped tin oxide (ATO), fluorine doped tin oxide (FTO), Indium doped zinc oxide (IZO), and ZnO. The transparent conductive layer may be formed by depositing the conductive material on the base material using a known method such as sputtering, electron beam deposition, chemical vapor deposition, and a sol-gel coating method.

Also, the type of the electrochromic material is not particularly limited, but the electrochromic material may include an inorganic metal oxide such as $WO_3$, $MoO_3$, $V_2O_5$, $TiO_2$, and NiO; a conductive polymer such as polypyrrole, polyaniline, polyazulene, polypyridine, polyindole, polycarbazole, polyazine, and polythiophene; and an organic chromic material such as viologen, anthraquinone and phenocyazine.

A method of stacking the electrochromic material on the electrode is not particularly limited as long as it is a method of forming a thin film of a predetermined height from a base surface according to a surface profile, and, for example, the method may include a vacuum deposition method such as sputtering.

Among the above electrochromic materials, $WO_3$, for example, is a material colored by a reduction reaction, and NiO is a material colored by an oxidation reaction. An electrochemical mechanism, by which electrochromism occurs in the electrochromic device including the above inorganic metal oxide, may be described as Reaction Formula 1. Specifically, when a voltage is applied to the electrochromic device, protons (H$^+$) or lithium ions (Li$^+$) included in the electrolyte are intercalated into or deintercalated from the electrochromic material depending on the polarity of the current, and, in this case, since the oxidation number of transition metal included in the electrochromic material may be changed in order to satisfy the charge neutral condition of the compound, optical properties, e.g., transmittance (color), of the electrochromic material itself may be changed.

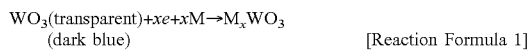
   (dark blue)                                  [Reaction Formula 1]

(where M is a proton or alkali metal cation, e.g., Li$^+$).

The electrochromic device thus configured may be manufactured according to a typical method known in the art, and, for example, the method may include the steps of: (a) preparing a first electrode and a second electrode; (b) sealing after injecting the gel polymer electrolyte composition according to the present invention between the first electrode and second electrode prepared; and (c) forming a gel polymer electrolyte by polymerizing the injected electrolyte composition.

Hereinafter, the present invention will be described in detail according to examples. However, the invention may be embodied in many different forms and should not be construed as being limited to the embodiments set forth herein. Rather, these example embodiments are provided so that this description will be thorough and complete, and will fully convey the scope of the present invention to those skilled in the art.

EXAMPLES

Example 1

(Preparation of Composition for Gel Polymer Electrolyte)

After a mixed solvent was prepared by mixing ethylene carbonate (EC) and ethylmethyl carbonate (EMC) in a volume ratio of 3:7 and adding 1.0 M LiPF$_6$ thereto, 5 g of the oligomer of Formula 3a (weight-average molecular weight of 7,800, molar ratio of unit B:unit A was 1:2), 0.5 g of 2,2'-azobis(iso-butyronitrile) (AIBN), as a polymerization initiator, and 0.5 wt % of vinylene carbonate (VC) were added to 94 g of the mixed solvent prepared to prepare a composition for a gel polymer electrolyte.

(Secondary Battery Preparation)

A positive electrode mixture slurry was prepared by adding 94 wt % of LiNi$_{1/3}$CO$_{1/3}$Mn$_{1/3}$O$_2$ (NCM) as a positive electrode active material, 3 wt % of carbon black as a conductive agent, and 3 wt % of polyvinylidene fluoride (PVDF) as a binder to N-methyl-2-pyrrolidone (NMP) as a solvent. An about 20 μm thick aluminum (Al) thin film, as a positive electrode collector, was coated with the positive electrode mixture slurry and dried, and the coated Al thin film was then roll-pressed to prepare a positive electrode.

A negative electrode mixture slurry was prepared by adding 96 wt % of carbon powder as a negative electrode active material, 3 wt % of PVDF as a binder, and 1 wt % of carbon black as a conductive agent to NMP as a solvent. A 10 μm thick copper (Cu) thin film, as a negative electrode collector, was coated with the negative electrode mixture slurry and dried, and the coated Cu thin film was then roll-pressed to prepare a negative electrode.

A battery was assembled using the positive electrode, the negative electrode, and a separator formed of three layers of polypropylene/polyethylene/polypropylene (PP/PE/PP), and the prepared composition for a gel polymer electrolyte was injected into the assembled battery. Then, after the assembled battery was left standing for 2 days, a secondary battery including a gel polymer electrolyte was prepared by heating the assembled battery at 60° C. for 24 hours.

Example 2

A secondary battery including a gel polymer electrolyte was prepared in the same manner as in Example 1 except that the oligomer of Formula 3b (weight-average molecular weight of 7,800, molar ratio of unit B:unit A was 1:4) was used instead of the oligomer of Formula 3a during the preparation of the composition for a gel polymer electrolyte in Example 1.

Example 3

A secondary battery including a gel polymer electrolyte was prepared in the same manner as in Example 1 except that 12 g of the oligomer of Formula 3c (weight-average molecular weight of 7,800, molar ratio of unit B:unit A was 1:4) was mixed with 87 g of the mixed solvent during the preparation of the composition for a gel polymer electrolyte in Example 1.

Example 4

A secondary battery including a gel polymer electrolyte was prepared in the same manner as in Example 1 except that 12 g of the oligomer of Formula 3d (weight-average molecular weight of 7,800, molar ratio of unit B:unit A was 1:4) was mixed with 87 g of the mixed solvent during the preparation of the composition for a gel polymer electrolyte in Example 1.

Example 5

A secondary battery including a gel polymer electrolyte was prepared in the same manner as in Example 1 except that 12 g of the oligomer of Formula 3e (weight-average molecular weight of 7,800, molar ratio of unit B:unit A was 1:4) was mixed with 87 g of the mixed solvent during the preparation of the composition for a gel polymer electrolyte in Example 1.

Example 6

A secondary battery including a gel polymer electrolyte was prepared in the same manner as in Example 1 except that 12 g of the oligomer of Formula 3f (weight-average molecular weight of 7,800, molar ratio of unit B:unit A was 1:4) was mixed with 87 g of the mixed solvent during the preparation of the composition for a gel polymer electrolyte in Example 1.

Example 7

A secondary battery including a gel polymer electrolyte was prepared in the same manner as in Example 1 except that 24 g of inorganic particles (LLZO) were further included during the preparation of the composition for a gel polymer electrolyte in Example 1.

Comparative Example 1

A secondary battery including a gel polymer electrolyte was prepared in the same manner as in Example 1 except that an acrylate-based oligomer composed of dipentaerythritol pentaacrylate was used instead of the oligomer of Formula 3a during the preparation of the composition for a gel polymer electrolyte in Example 1.

Comparative Example 2

A secondary battery including a gel polymer electrolyte was prepared in the same manner as in Example 1 except that an oligomer of the following Formula 4 was included instead of the oligomer of Formula 3a during the preparation of the composition for a gel polymer electrolyte in Example 1.

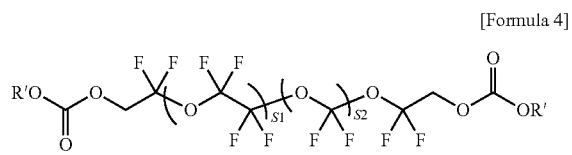

[Formula 4]

In Formula 4,
R' and R" are methyl, and S1 and S2 are 50, respectively.

Comparative Example 3

A secondary battery including a gel polymer electrolyte was prepared in the same manner as in Example 1 except that 22 g of the oligomer of Formula 3a was added to g of the mixed solvent during the preparation of the composition for a gel polymer electrolyte in Example 1.

Comparative Example 4

A secondary battery including a gel polymer electrolyte was prepared in the same manner as in Example 1 except that 0.1 g of the oligomer of Formula 3a was used during the preparation of the composition for a gel polymer electrolyte in Example 1.

EXPERIMENTAL EXAMPLES

Experimental Example 1. Ionic Conductivity Measurement

The gel polymer electrolytes of Examples 1 to 7 and Comparative Examples 1 to 4 prepared by thermal polymerization at 60° C. for 24 hours were sandwiched between a pair of platinum electrode discs having a diameter of 1 cm, respectively. $Li^+$ ion conductivity of each gel polymer electrolyte in this state was measured by an alternating current impedance method. Model VMP3 from Bio-Logic SAS was used as a measurement instrument, and the measurement was performed at room temperature under a frequency range of 0.1 Hz to 10,000 Hz with an amplitude of 10 mV.

The results thereof are presented in the following Table 1.

Experimental Example 2. Li Cation Transfer Coefficient Measurement

After putting acetone-$d_6$ in an inner tube for nuclear magnetic resonance (NMR) measurement, the compositions for a gel polymer electrolyte prepared in Examples 1 to 7 and Comparative Examples 1 to 4 were disposed on the outside of the inner tube, and a $Li^+$ ion transfer coefficient was then measured by using the following measurement method. The results thereof are presented in the following Table 1.

[Measurement Method]
$Li^+$ ion transfer coefficient $Li^+$ ion diffusivity/($Li^+$ ion diffusivity+anion diffusivity)
NMR equipment: Varian 500 MHz NMR/dual probe
$Li^+$ ion diffusivity: measured using $^7Li$ diffusion NMR
<$^7Li$ diffusion NMR Experimental Conditions>
Diffusion gradient length: 4.0 msec
Diffusion delay: 200.0 msec
Lowest gradient value: 100
Highest gradient value: 30,000
Number of increments: 16
Anion diffusivity: measured using $^{19}F$ diffusion NMR.
<$^{19}F$ diffusion NMR Experimental Conditions>
Diffusion gradient length: 3.0 msec
Diffusion delay: 70.0 msec
Lowest gradient value: 1,000
Highest gradient value: 23,000
Number of increments: 16
Solvent used: acetone-$d_6$ (in this case, in order to measure a diffusion value of a sample itself, an inner tube (acetone-$d_6$) was used to prevent the mixing of the sample and the deuterium solvent.)
Pulse sequence: stimulated echo with gradient pulse, and Gradient amplitude: a gradient amplitude was adjusted so that a peak intensity of the maximum gradient power was about 2% to about 5% of a peak intensity of the minimum gradient power, this range was divided into 16 steps in the same manner as solution NMR, and 16 different amplitudes were applied to each sample.

Experimental Example 3. Charge and Discharge Measurement

The secondary battery cells (design capacity: 760 mAh) prepared in Examples 1 to 6 and Comparative Example 1 to 4 were charged at a constant current of 1.0 C at 60° C. until a voltage reached 4.35 V and were subsequently charged at a constant voltage of 4.35 V until the current was reduced to reach 1/20 C. Thereafter, the secondary battery cells were discharged at a constant current of 1.0 C to a voltage of 3.0 V. The charge and discharge were repeated for 100 cycles.

Capacity retention ratios were calculated from the above results using the following equation, and the results thereof are presented in the following Table 1.

Capacity retention ratio in a $100^{th}$ cycle=discharge capacity in the $100^{th}$ cycle/discharge capacity in the 1st cycle  <Equation>

TABLE 1

| | Ionic conductivity (S/cm) | $Li^+$ ion transfer coefficient | $1^{st}$ cycle discharge capacity (mAh) | $100^{th}$ cycle discharge capacity (mAh) | Capacity retention ratio (%) in the $100^{th}$ cycle |
|---|---|---|---|---|---|
| Example 1 | $7.2 \times 10^{-4}$ | 0.435 | 754 | 739 | 98.01 |
| Example 2 | $6.9 \times 10^{-4}$ | 0.420 | 751 | 728 | 96.9 |
| Example 3 | $7.5 \times 10^{-4}$ | 0.443 | 745 | 715 | 96 |
| Example 4 | $7.5 \times 10^{-4}$ | 0.423 | 740 | 710 | 96 |
| Example 5 | $7.5 \times 10^{-4}$ | 0.415 | 747 | 720 | 96.4 |
| Example 6 | $7.5 \times 10^{-4}$ | 0.430 | 739 | 698 | 94.5 |

TABLE 1-continued

| | Ionic conductivity (S/cm) | $Li^+$ ion transfer coefficient | $1^{st}$ cycle discharge capacity (mAh) | $100^{th}$ cycle discharge capacity (mAh) | Capacity retention ratio (%) in the $100^{th}$ cycle |
|---|---|---|---|---|---|
| Example 7 | $8.2 \times 10^{-4}$ | 0.490 | — | — | — |
| Comparative Example 1 | $6.1 \times 10^{-4}$ | 0.375 | 748 | 617 | 82.5 |
| Comparative Example 2 | $4.8 \times 10^{-4}$ | 0.410 | 700 | 430 | 61.4 |
| Comparative Example 3 | $2.5 \times 10^{-4}$ | 0.550 | 548 | 117 | 21.4 |
| Comparative Example 4 | $8.7 \times 10^{-4}$ | 0.379 | 755 | 101 | 13.4 |

As illustrated in Table 1, the ionic conductivity of the gel polymer electrolyte of Comparative Example 1 was $6.1 \times 10^{-4}$ and the ionic conductivity of the gel polymer electrolyte of Comparative Example 2 was $4.8 \times 10^{-4}$. In contrast, most of the ionic conductivities of the gel polymer electrolytes of Examples 1 to 7 of the present invention were $6.9 \times 10^{-4}$ or more, wherein it may be understood that the ionic conductivities were mostly improved by about 10% or more.

Also, the $Li^+$ ion transfer coefficients of the secondary batteries of Examples 1 to 7 of the present invention were 0.415 or more, wherein it may be understood that the $Li^+$ ion transfer coefficients of the secondary batteries of Examples 1 to 7 were improved in comparison to 0.375, the ion transfer coefficient of the secondary battery of Comparative Example 1, and 0.410, the ion transfer coefficient of the secondary battery of Comparative Example 2.

Furthermore, the $100^{th}$ cycle discharge capacity (mAh) of the secondary battery of Comparative Example 1 was 617, the capacity retention ratio (%) in the $100^{th}$ cycle was 82.5%, the $100^{th}$ cycle discharge capacity (mAh) of the secondary battery of Comparative Example 2 was 430, and the capacity retention ratio (%) in the $100^{th}$ cycle was 61.4%. In contrast, the $100^{th}$ cycle discharge capacities (mAh) of the secondary batteries of Examples 1 to 7 of the present invention were 698 or more, and the capacity retention ratios (%) in the $100^{th}$ cycle were 94.5% or more, wherein it may be understood that these values were better than those of the secondary batteries of Comparative Examples 1 and 2.

With respect to the secondary battery of Comparative Example 3 which included the gel polymer electrolyte containing an excessive amount of the first oligomer, it may be understood that the $Li^+$ ion transfer coefficient was high at 0.550 due to anion immobilization, but the ionic conductivity was low at $2.5 \times 10^{-4}$ due to an increase in resistance. Particularly, since a negative electrode Li precipitation reaction may occur due to kinetic degradation caused by the low ionic conductivity, the $100^{th}$ cycle discharge capacity (mAh) was 117 and the capacity retention ratio (%) in the $100^{th}$ cycle was 21.4%, wherein it may be understood that these values were significantly low.

Also, with respect to the secondary battery of Comparative Example 4 which included the gel polymer electrolyte containing a trace amount of the first oligomer, it may be understood that the ionic conductivity was the highest at $8.7 \times 10^{-4}$ due to physical properties of the liquid electrolyte, but the $Li^+$ ion transfer coefficient was low at 0.370. Particularly, since the formation of a stable matrix polymer was difficult, the $100^{th}$ cycle discharge capacity (mAh) was 101 and the capacity retention ratio (%) in the $100^{th}$ cycle was 13.4%, wherein it may be understood that these values were significantly low.

The invention claimed is:

1. A gel polymer electrolyte comprising:
   a matrix polymer; and
   an electrolyte solution impregnated in the matrix polymer,
   wherein the matrix polymer is formed in a three-dimensional network structure by polymerizing a first oligomer which is a compound represented by Formula 3:

[Formula 3]

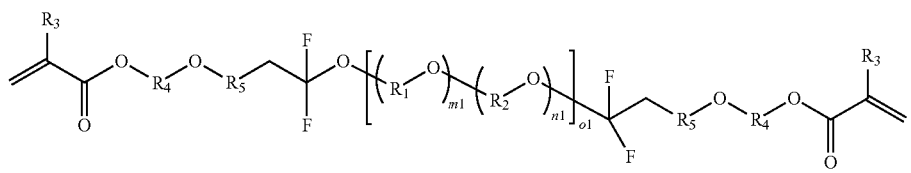

wherein, in Formula 3, $R_1$ and $R_2$ are each independently a fluorine-substituted or unsubstituted alkylene group having 1 to 4 carbon atoms, $R_3$ is hydrogen, or an alkyl group having 1 to 6 carbon atoms, $R_4$ is an alkylene group having 1 to 6 carbon atoms, —$CH_2$—$R_6$—$CH_2$—, or $CH_2$—$R_7$—O—$R_8$—$CH_2$—, wherein $R_6$, $R_7$, and $R_8$ are alkylene groups having 1 to 5 carbon atoms in which at least one acrylate group is substituted, $R_5$ is an alkylene group having 1 to 5 carbon atoms, or (CO—$R_9$—O—)$_r$—CO—NH—$R_{10}$—NH—CO—O, wherein $R_9$ is an alkylene group having 1 to 10 carbon atoms, and $R_{10}$ is an aliphatic, alicyclic, or aromatic hydrocarbon group, m1, n1, and o1 are the numbers of repeating units, m1 is an integer of 1 to 10, n1 is an integer of 1 to 10, o1 is an integer of 1 to 500, and r is an integer of 0 to 3.

2. The gel polymer electrolyte of claim 1, wherein the first oligomer represented by Formula 3 comprises at least one compound selected from the group consisting of compounds represented by Formulae 3a to 3f:

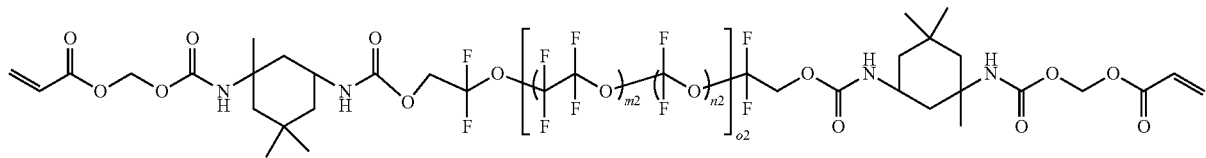

[Formula 3a]

wherein, in Formula 3a,
m2, n2, and o2 are the numbers of repeating units,
m2 is an integer of 1 to 10,
n2 is an integer of 1 to 10, and
o2 is an integer of 1 to 500,

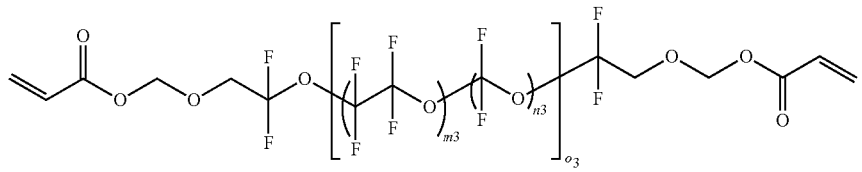

[Formula 3b]

wherein, in Formula 3b,
m3, n3, and o3 are the numbers of repeating units,
m3 is an integer of 1 to 10,
n3 is an integer of 1 to 10, and
o3 is an integer of 1 to 500,

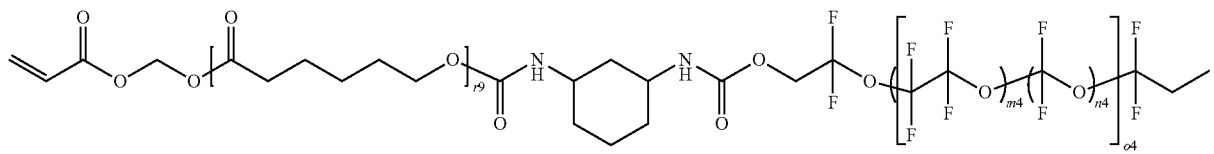

[Formula 3c]

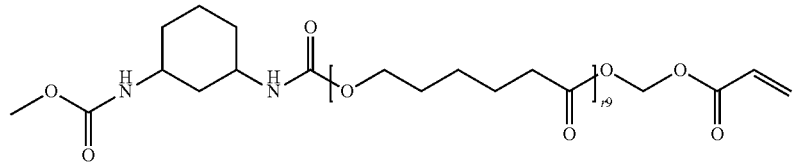

wherein, in Formula 3c,
m4, n4, and o4 are the numbers of repeating units,
m4 is an integer of 1 to 10,
n4 is an integer of 1 to 10,
o4 is an integer of 1 to 500, and
r9 is an integer of 1 to 3,

[Formula 3d]

-continued

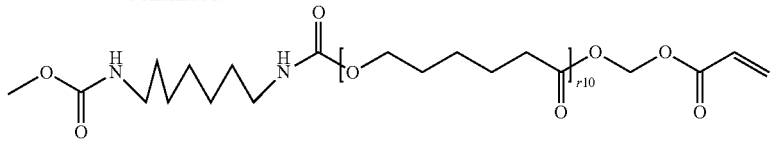

wherein, in Formula 3d,
m5, n5, and o5 are the numbers of repeating units,
m5 is an integer of 1 to 10,
n5 is an integer of 1 to 10,
o5 is an integer of 1 to 500, and
r10 is an integer of 1 to 3,

[Formula 3e]

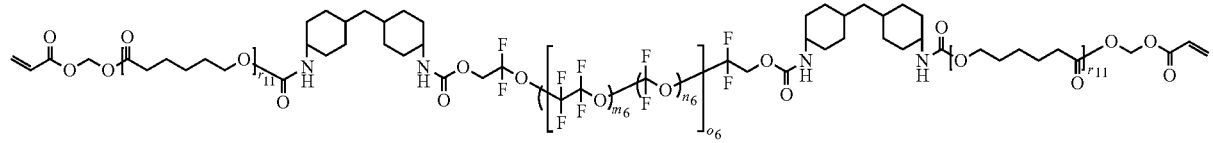

wherein, in Formula 3e,
m6, n6, and o6 are the numbers of repeating units,
m6 is an integer of 1 to 10,
n6 is an integer of 1 to 10,
o6 is an integer of 1 to 500, and
r11 is an integer of 1 to 3, least one selected from the group consisting of methyl acrylate, methyl methacrylate, ethyl acrylate, ethyl methacrylate, propyl acrylate, propyl methacrylate, butyl acrylate, butyl methacrylate, hexyl acrylate, hexyl methacrylate, ethylhexyl acrylate, ethylhexyl methacrylate, 2,2,2-trifluoroethyl acrylate, 2,2,2-trifluoroethyl methacrylate, 2,2,3,3-tetrafluoropropyl acrylate, and 2,2,3,3-tetrafluoropropyl methacrylate.

4. The gel polymer electrolyte of claim 3, wherein the unit C is included in an amount of 50 wt % or less based on a total amount of the first oligomer.

[Formula 3f]

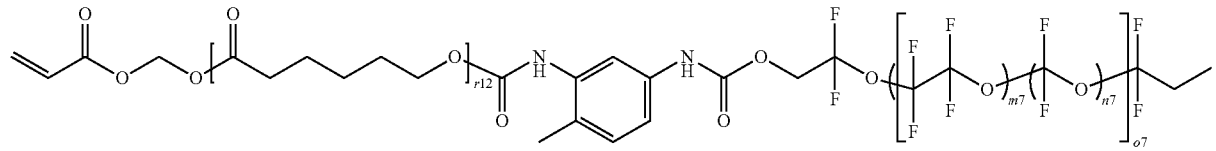

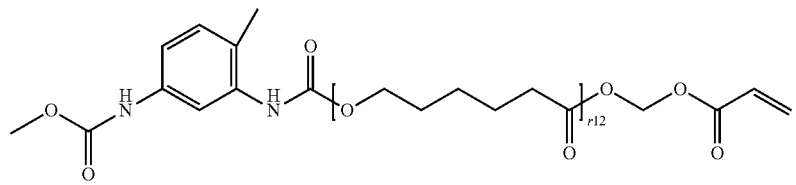

wherein, in Formula 3f,
m7, n7, and o7 are the numbers of repeating units,
m7 is an integer of 1 to 10,
n7 is an integer of 1 to 10,
o7 is an integer of 1 to 500, and
r12 is an integer of 1 to 3.

3. The gel polymer electrolyte of claim 1, wherein the first oligomer further comprises unit C which is derived from at 5. The gel polymer electrolyte of claim 1, further comprising inorganic particles.

6. A composition for the gel polymer electrolyte of claim 1, the composition comprising:
a lithium salt;
an electrolyte solution solvent;
a polymerization initiator; and
a first oligomer is a compound of Formula 3,

[Formula 3]

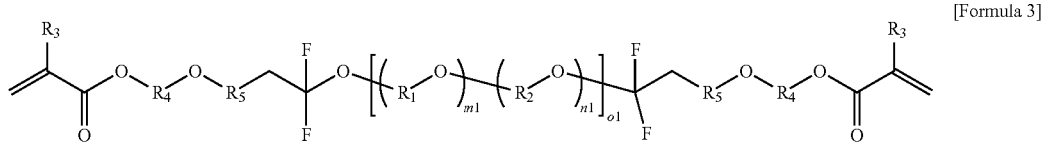

wherein, in Formula 3, $R_1$ and $R_2$ are each independently a fluorine-substituted or unsubstituted alkylene group having 1 to 4 carbon atoms, $R_3$ is hydrogen, or an alkyl group having 1 to 6 carbon atoms, $R_4$ is an alkylene group having 1 to 6 carbon atoms, —$CH_2$—$R_6$—$CH_2$—, or —$CH_2$—$R_7$—O—$R_8$—$CH_2$—, wherein $R_6$, $R_7$, and $R_8$ are alkylene groups having 1 to 5 carbon atoms in which at least one acrylate group is substituted, $R_5$ is an alkylene group having 1 to 5 carbon atoms, or —(CO—$R_9$—O—)$_r$—CO—NH—$R_{10}$—NH—CO—O, wherein $R_9$ is an alkylene group having 1 to 10 carbon atoms, and $R_{10}$ is an aliphatic, alicyclic, or aromatic hydrocarbon group, m1, n1, and o1 are the numbers of repeating units, m1 is an integer of 1 to 10, n1 is an integer of 1 to 10, o1 is an integer of 1 to 500, and r is an integer of 0 to 3.

7. A lithium secondary battery comprising:
a positive electrode and a negative electrode;
a separator disposed between the positive electrode and the negative electrode; and
the gel polymer electrolyte of claim 1 disposed between the positive electrode, the negative electrode, and the separator.

* * * * *